United States Patent
Weng et al.

(10) Patent No.: US 9,374,682 B2
(45) Date of Patent: Jun. 21, 2016

(54) METHOD AND SYSTEM FOR MANAGING REAL-TIME AUDIO BROADCASTS AMONG A GROUP OF USERS

(71) Applicant: Tencent Technology (Shenzhen) Company Limited, Shenzhen (CN)

(72) Inventors: Yueteng Weng, Shenzhen (CN); Zhuo Tang, Shenzhen (CN); Bin Zhang, Shenzhen (CN); Kai Li, Shenzhen (CN); Yi Dan, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 138 days.

(21) Appl. No.: 14/091,304

(22) Filed: Nov. 26, 2013

(65) Prior Publication Data

US 2014/0148209 A1    May 29, 2014

Related U.S. Application Data

(63) Continuation of application No. PCT/CN2013/079563, filed on Jul. 18, 2013.

(30) Foreign Application Priority Data

Nov. 28, 2012 (CN) .......................... 2012 1 0495165

(51) Int. Cl.
*H04W 4/06* (2009.01)
*H04L 12/58* (2006.01)
(Continued)

(52) U.S. Cl.
CPC ............. *H04W 4/06* (2013.01); *H04L 12/1818* (2013.01); *H04L 51/04* (2013.01); *H04W 4/08* (2013.01); *H04W 4/10* (2013.01)

(58) Field of Classification Search
CPC . H04L 12/1818; H04L 51/04; H04L 12/1822; H04L 65/403; H04L 12/581; H04L 29/12292; H04L 61/2069; H04W 4/06; H04W 4/08; H04W 4/10; H04W 8/186; H04W 4/12
See application file for complete search history.

(56) References Cited

U.S. PATENT DOCUMENTS 8,165,628 B1    4/2012 Sinai
2006/0142036 A1*    6/2006 Lim .............................. 455/518
(Continued)

FOREIGN PATENT DOCUMENTS

CN    1717077 A    1/2006
CN    101159890 A    4/2008
(Continued)

OTHER PUBLICATIONS

Tencent Technology, ISRWO, PCT/CN2013/079563, Oct. 24, 2013, 6 pgs.
(Continued)

*Primary Examiner* — Fanghwa Wang
(74) *Attorney, Agent, or Firm* — Morgan, Lewis & Bockius LLP

(57) ABSTRACT

An information exchange method and system, a server and an instant messaging client are provided. The method may include: when receiving a chat session request message sent by a first instant messaging client in an intercom group, receiving, by a server, chat session audio information transmitted by the first instant messaging client; and when receiving a chat session stop message sent by the first instant messaging client, distributing, by the server, the chat session audio information to instant messaging clients, except the first instant messaging client, in the intercom group for real-time playing. The instant messaging client implements an intercom talk function based on a network, thereby saving the purchase cost and improving the confidentiality and stability of information exchange.

18 Claims, 18 Drawing Sheets

---

When receiving a chat session request message sent by a first instant messaging client in an intercom group, the server receives chat session audio information transmitted by the first instant messaging client — S101

When receiving a chat session stop message sent by the first instant messaging client, the server distributes the chat session audio information to instant messaging clients, except the first instant messaging client, in the intercom group for real-time playing — S102

(51) Int. Cl.
*H04W 4/08* (2009.01)
*H04L 12/18* (2006.01)
*H04W 4/10* (2009.01)

(56) References Cited

U.S. PATENT DOCUMENTS

| | | |
|---|---|---|
| 2009/0164587 A1 | 6/2009 | Gavita et al. |
| 2009/0204673 A1 | 8/2009 | Tian et al. |
| 2010/0016006 A1 | 1/2010 | Inagaki |
| 2010/0246788 A1* | 9/2010 | Menard et al. ............... 379/159 |
| 2012/0162350 A1 | 6/2012 | Lee et al. |
| 2012/0275582 A1 | 11/2012 | Odinak |
| 2013/0268592 A1* | 10/2013 | Yerli ...................... G06Q 50/00 709/204 |

FOREIGN PATENT DOCUMENTS

| | | |
|---|---|---|
| JP | 2007201916 A | 8/2007 |
| JP | 2008017071 A | 1/2008 |
| JP | 2010171956 A | 8/2010 |
| JP | 2011182398 A | 9/2011 |
| JP | 2012217068 A | 11/2012 |
| WO | WO 2007119586 A1 | 10/2007 |

OTHER PUBLICATIONS

Tencent Technology, Written Opinion, PCT/CN2013/079563, Oct. 15, 2013, 3 pgs.

Tencent Technology, IPRP, PCT/CN2013/079563, Jun. 2, 2015, 4 pgs.

* cited by examiner

METHOD AND SYSTEM FOR MANAGING REAL-TIME AUDIO BROADCASTS AMONG A GROUP OF USERS

RELATED APPLICATIONS

This application is a continuation application of PCT Patent Application No. PCT/CN2013/079563, entitled "METHOD AND SYSTEM FOR MANAGING REAL-TIME AUDIO BROADCASTS AMONG A GROUP OF USERS" filed on Jul. 18, 2013, which claims priority to Chinese Patent Application No. 201210495165.1, entitled "INFORMATION INTERACTION METHOD AND SYSTEM, SERVER, AND INSTANT MESSAGING CLIENT" and filed on Nov. 28, 2012, both of which are incorporated by reference in their entirety.

TECHNICAL FIELD

The disclosed implementations relate generally to the field of network technologies, and in particular, to an information exchange method and system, a server, and an instant messaging client.

BACKGROUND

A two way radio is a bidirectional mobile communication tool, which uses an antenna to transmit and receive radio frequency signals and can implement a short-distance intercom talk without assistance from any network. However, for a conventional intercom talk, the cost for purchasing two way radios and transceiver devices needs to be added, and an intercom function is limited by the distance, so that a long-distance intercom talk cannot be implemented. In addition, information exchange in an intercom talk process is based on a radio frequency, which is not beneficial for the information confidentiality and stability.

SUMMARY

In accordance with some embodiments, an information exchange method is performed at a mobile device that is communicatively coupled to a remote server, the mobile device having one or more processors and memory for storing program modules to be executed by the one or more processors. The mobile device detects a first instruction from a user of the mobile device to start a real-time audio broadcast to a plurality of client devices associated with a group of users. In response to the first instruction, the mobile device sends an audio broadcast start request to the remote server, and the remote server is configured to instruct the plurality of client devices to enter a broadcast-disable mode. The mobile device captures and streams audio signals from the user of the mobile device to the remote server, and the remote server is configured to transmit the audio signals to the plurality of client devices. The mobile device detects a second instruction from the user of the mobile device to stop the real-time audio broadcast to the plurality of client devices. In response to the second instruction, the mobile device sends an audio broadcast stop request to the remote server, and the remote server is configured to instruct the plurality of client devices to enter a broadcast-enable mode.

In accordance with some embodiments, a computer-implemented method is performed at a server system for managing real-time audio broadcasts for a group of users participating from respective mobile devices, the server system having one or more processors and memory for storing program modules to be executed by the one or more processors. The server system receives an audio broadcast start request from a user at a mobile device. In response to the audio broadcast start request: the server system instructs the other mobile devices to enter a broadcast-disable mode, and returns an approval response to the mobile device. Next, the server system receives real-time audio streams from the mobile device and forwards the real-time audio streams to the other mobile devices. The server system then receives an audio broadcast stop request from the user at the mobile device. In response to the audio broadcast stop request, the server system instructs the other mobile devices to enter a broadcast-enable mode and returns a confirmation response to the mobile device.

The embodiments of the present application bring the following beneficial effects:

in the embodiments of the present application, a server in a network is adopted to receive chat session audio information transmitted by an instant messaging client in an intercom group and distribute the chat session audio information to other instant messaging clients, except the instant messaging client, in the intercom group for real-time playing, thereby implementing an intercom talk function between the instant messaging clients in the intercom group and saving the cost for purchasing extra two way radios and transceiver devices. In addition, information exchange is implemented based on the server in the network instead of conventional radio frequencies, thereby improving the confidentiality and stability of the information exchange.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

To illustrate the technical solutions in the embodiments of the present application or in the prior art more clearly, the accompanying drawings required for describing the embodiments or the prior art are introduced in the following briefly. Apparently, the accompanying drawings in the following descriptions merely show some of the embodiments of the present application, and persons of ordinary skill in the art can obtain other drawings according to the accompanying drawings without creative efforts.

DETAILED DESCRIPTION

The technical solutions of the present application will be clearly and fully described in the following with reference to the accompanying drawings. It is obvious that the embodiments to be described are only a part rather than all of the embodiments of the present application. All other embodiments obtained by persons of ordinary skill in the art based on the embodiments of the present application without creative efforts shall fall within the protection scope of the present application.

In the embodiments of the present application, an instant messaging client includes, but is not limited to, apparatuses such as a personal computer (PC), a tablet computer, a cell phone, a smart phone, an electronic reader, and a notebook computer. The instant messaging client is provided with a device or a functional module capable of implementing an intercom talk, where the device for implementing an intercom talk may be an instant messaging application, and the functional module for implementing an intercom talk may be a functional module for implementing an intercom talk in an instant messaging application. An intercom group refers to an instant messaging group having an intercom function, and member users in the intercom group may implement an intercom talk through instant messaging clients. An instant messaging client in an intercom group refers to an instant messaging client corresponding to a member user in the intercom group. For example, a first instant messaging client in the intercom group is an instant messaging client corresponding to a first member user in the intercom group, or a second instant messaging client in the intercom group is an instant messaging client corresponding to a second member user in the intercom group. Unless otherwise stated, in subsequent embodiments of the present application, a first instant messaging client in an intercom group refers to any one instant messaging client in the intercom group, and a second instant messaging client in the intercom group is any one instant messaging client, except the first instant messaging client, in the intercom group.

An information exchange method provided in an embodiment of the present application is introduced in detail in the following with reference to accompanying drawings FIG. 1 to FIG. 8.

Figure 1:
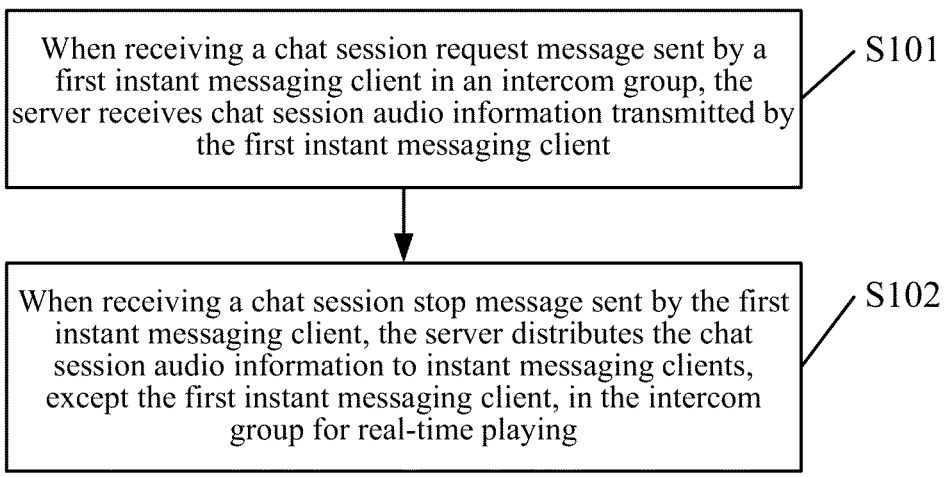
FIG. 1 is a flow chart of an information exchange method provided in an embodiment of the present application.

FIG. 1 is a flow chart of an information exchange method provided in an embodiment of the present application. A process of an information exchange method executed by a server is illustrated in this embodiment, and the method may include the following step S101 to step S102.

S101: When receiving a chat session request message sent by a first instant messaging client in an intercom group, the server receives chat session audio information transmitted by the first instant messaging client.

The first instant messaging client is any one instant messaging client in the intercom group. When a member user in the intercom group intends to use an intercom function of an instant messaging client, the member user may initiate a chat session operation. In this step, the first instant messaging client sends a chat session request message to the server according to a chat session operation of a first member user, records chat session audio information of the first member user in real time, and uploads the chat session audio information of the first member user to the server in real time. When receiving the chat session request message sent by the first instant messaging client, the server may learn that the first instant messaging client is about to perform the intercom function and is about to transmit the chat session audio information. The server prepares for transmission of the chat session audio information. For example, the server allocates a cache space and establishes a transmission connection with the first instant messaging client. The server receives in real time the chat session audio information uploaded by the first instant messaging client.

S102: When receiving a chat session stop message sent by the first instant messaging client, the server distributes the chat session audio information to instant messaging clients, except the first instant messaging client, in the intercom group for real-time playing.

The first member user may initiate a chat session stop operation, and the first instant messaging client sends a chat session stop message to the server according to the chat session stop operation of the first member user. The server learns, according to the chat session stop message of the first instant messaging client, that the first instant messaging client ends the intercom function and stops transmitting chat session audio information. The server distributes the chat session audio information to the instant messaging clients, except the first instant messaging client, in the intercom group for real-time playing, thereby implementing the intercom function between the instant messaging clients in the intercom group.

In the embodiment of the present application, a server in a network is adopted to receive chat session audio information transmitted by an instant messaging client in an intercom group and distribute the chat session audio information to other instant messaging clients, except the instant messaging client, in the intercom group for real-time playing, thereby implementing an intercom talk function between the instant messaging clients in the intercom group and saving the cost for purchasing extra two way radios and transceiver devices. In addition, information exchange is implemented based on the server in the network instead of conventional radio frequencies, thereby improving the confidentiality and stability of the information exchange.

Figure 2:
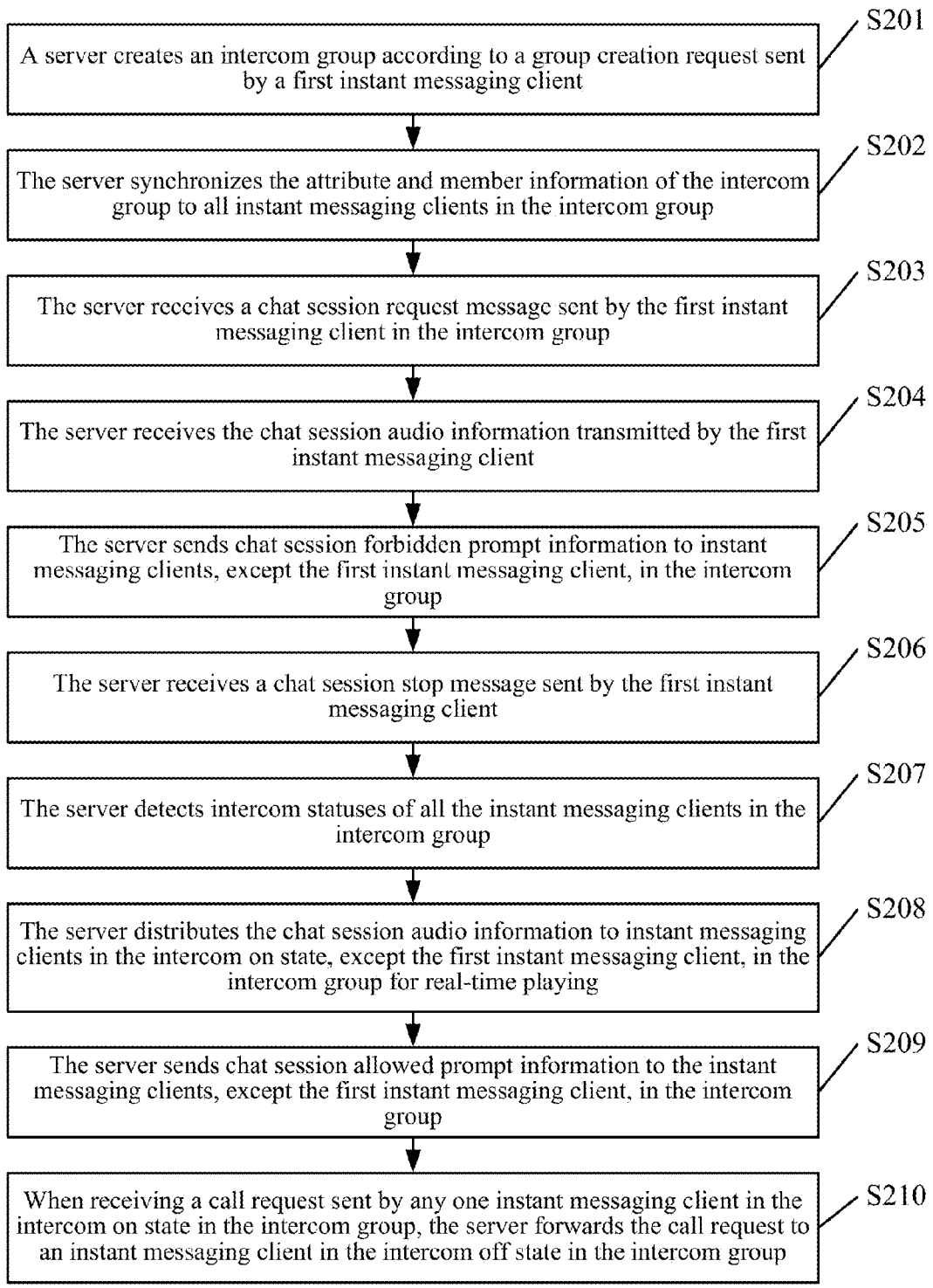
FIG. 2 is a flow chart of another information exchange method provided in an embodiment of the present application.

FIG. 2 is a flow chart of another information exchange method provided in an embodiment of the present application. A process of an information exchange method executed by a server is illustrated in this embodiment, and the method may include the following step S201 to step S210.

S201: A server creates an intercom group according to a group creation request sent by a first instant messaging client.

The group creation request includes: an attribute and member information of the intercom group, where the attribute of the intercom group may include an identity (ID) number of the intercom group and the attribute of the intercom group may also include information such as a name, a type, a rank, and a creation time of the intercom group. The ID of the intercom group may be represented in a manner of a character string, and may also be represented in a manner of a two-dimensional bar code. A user corresponding to the first instant messaging client may initiatively create an intercom group. Specifically, the user may input attributes of the intercom group to be created into the first instant messaging client, such as a name, a type, and an ID, and may also select a member for the intercom group to be created. Selection of a member may include the following implementation manners. In a first implementation manner, the user may select a contact from an instant messaging group, to which the user belongs, as a member of the intercom group. In a second implementation manner, the user may select a contact from instant messaging contacts of the user as a member of the intercom group. In this step, the first instant messaging client generates the group creation request according to the attribute and member information of the intercom group input by the user, and sends the group creation request to the server, so as to create the intercom group.

S202: The server synchronizes the attribute and member information of the intercom group to all instant messaging clients in the intercom group.

The server synchronizes the attribute and member information of the intercom group to all the instant messaging clients in the intercom group and all members in the intercom group may view the attribute and member information of the intercom group through the instant messaging clients of the intercom group. It should be noted that, a user not belonging to the intercom group may request joining the intercom group, and a member user in the intercom group may perform a group exiting operation, so as to exit the intercom group. The server updates member information about the intercom group in real time according to a joining operation of a user not belonging to the intercom group and/or a group exiting operation of a member user in the intercom group, and synchronizes the updated member information about the intercom group to the instant messaging clients of the intercom group.

S203: The server receives a chat session request message sent by the first instant messaging client in the intercom group.

When a first member user in the intercom group intends to use an intercom function of the first instant messaging client, the first member user may initiate a chat session operation. Specifically, the first instant messaging client may provide an intercom button, and when the first member user pushes the intercom button, a chat session operation is initiated, and the first instant messaging client sends a chat session request message to the server. The chat session request message may enable the server to learn that the first instant messaging client is about to perform the intercom function and is about to transmit chat session audio information. The server prepares for transmission of the chat session audio information. For example, the server allocates a cache space and establishes a transmission connection with the first instant messaging client.

S204: The server receives the chat session audio information transmitted by the first instant messaging client.

The first instant messaging client records the chat session audio information of the first member user in real time, and uploads the chat session audio information of the first member user to the server in real time. In this step, the server may receive the chat session audio information, transmitted by the first instant messaging client, through networks such as the Wireless Fidelity (WIFI), General Packet Radio Service (GPRS), or 3rd-Generation (3G) mobile communication technology.

S205: The server sends chat session forbidden prompt information to instant messaging clients, except the first instant messaging client, in the intercom group.

The chat session forbidden prompt information is used for providing instant messaging clients, except the first instant messaging client, in the intercom group with a prompt that a session resource of the intercom group is currently occupied by the first instant messaging client, so that other member users except the first member user in the intercom group cannot initiate a chat session operation.

In this embodiment, step S204 and step S205 do not have a specific performance order, that is, in this embodiment, it is acceptable that step S205 may be performed first and step S204 is performed next, and it is also acceptable that step S204 and step S205 are performed synchronously.

S206: The server receives a chat session stop message sent by the first instant messaging client.

After finishing an intercom session, the first member user in the intercom group may initiates a chat session stop operation. Specifically, when the first member user releases the intercom button on the first instant messaging client and stops pushing the intercom button, the first member user initiates a chat session stop operation, and the first instant messaging client sends a chat session stop message to the server. According to the chat session stop message sent by the first instant messaging client, the server may learn that the first instant messaging client ends the intercom function and stops transmitting chat session audio information.

S207: The server detects intercom statuses of all the instant messaging clients in the intercom group.

The server manages and maintains statuses of the instant messaging clients in the intercom group, which include a login status and an intercom status, where the login status includes an online state (including an online state, an away state, and an invisible state) or an offline state, and the intercom status includes an intercom on state or an intercom off state. It should be noted that, when an instant messaging client is in the intercom on state, it is indicated that the instant messaging client is currently in the online state and is allowed to receive chat session audio information, and when an instant messaging client is in the intercom off state, it is indicated that the instant messaging client is currently in the offline state and cannot receive chat session audio information, or the instant messaging client is currently in the online state but refuses to receive chat session audio information. The instant messaging clients in the intercom group report their own intercom statuses to the server, and the server stores the intercom statuses of the instant messaging clients in the intercom group, and timely updates stored content according to a change of the intercom statuses of the instant messaging clients. In this step, the server may read the intercom statuses of all the instant messaging clients in the intercom group from the stored content.

S208: The server distributes the chat session audio information to instant messaging clients in the intercom on state, except the first instant messaging client, in the intercom group for real-time playing.

In this step, the server selects an instant messaging client in the intercom on state from all instant messaging clients, except the first instant messaging client, in the intercom group, establishes a transmission connection, and transmits the chat session audio information, sent by the first instant messaging client, to the selected instant messaging client for real-time playing, thereby implementing the intercom function between the instant messaging clients in the intercom group.

S209: The server sends chat session allowed prompt information to the instant messaging clients, except the first instant messaging client, in the intercom group.

The chat session allowed prompt information is used for providing instant messaging clients, except the first instant messaging client, in the intercom group with a prompt that the session resource of the intercom group is currently released and is in an idle state, and each member user in the intercom group can initiate a chat session operation.

In this embodiment, step S208 and step S209 do not have a specific performance order, that is, in this embodiment, it is acceptable that step S209 may be performed first and step S208 is performed next, and it is also acceptable that step S208 and step S209 are performed synchronously.

S210: When receiving a call request sent by any one instant messaging client in the intercom on state in the intercom group, the server forwards the call request to an instant messaging client in the intercom off state in the intercom group.

Any one instant messaging client in the intercom on state in the intercom group may use a call function, where the call function is used for prompting an instant messaging client in the intercom off state to enable the intercom function, so as to perform session information exchange. Specifically, any one instant messaging client in the intercom on state in the intercom group may initiate a call request, where the call request may include audio data. For example, the call request includes audio data "please start the intercom to talk". When receiving the call request sent by any one instant messaging client in the intercom on state in the intercom group, the server forwards the call request to an instant messaging client in the intercom off state in the intercom group. It should be noted that, if the instant messaging client in the intercom off state in the intercom group is in the online state, the instant messaging client receives and outputs the call request, and if the instant messaging client in the intercom off state in the intercom group is in the offline state, the instant messaging client receives and outputs the call request after being switched to the online state next time. The instant messaging client in the intercom off state in the intercom group may choose, according to the call request, whether to enable the intercom function or not, and when the call request is clicked, the instant messaging client may play the audio data included in the call request.

In the embodiment of the present application, a server in a network is adopted to receive chat session audio information transmitted by an instant messaging client in an intercom group and distribute the chat session audio information to other instant messaging clients, except the instant messaging client, in the intercom group for real-time playing, thereby implementing an intercom talk function between the instant messaging clients in the intercom group and saving the cost for purchasing extra two way radios and transceiver devices. In addition, information exchange is implemented based on the server in the network instead of conventional radio frequencies, thereby improving the confidentiality and stability of the information exchange.

It should be noted that the embodiment shown in FIG. 2 may also include the following implementation manner. After performing steps S210 to S203, the server may jump to perform step S207 of detecting, by the server, the intercom statuses of all the instant messaging clients in the intercom group, returning to the first instant messaging client a list of instant messaging clients in the intercom on state, except the first instant messaging client, in the intercom group, and notifying the first instant messaging client of a transmission path between each instant messaging client in the list and the first instant messaging client, so that the first instant messaging client may send the chat session audio information directly through the transmission path to each instant messaging client in the list for real-time playing. The transmission path may be a direct path between the instant messaging clients or a path connecting the instant messaging clients through another network apparatus (for example, an apparatus such as a router). Therefore, the chat session audio information of the first instant messaging client transmitted through the transmission path may not be relayed through the server, thereby reducing a communication load and a processing load of the server.

Figure 3:
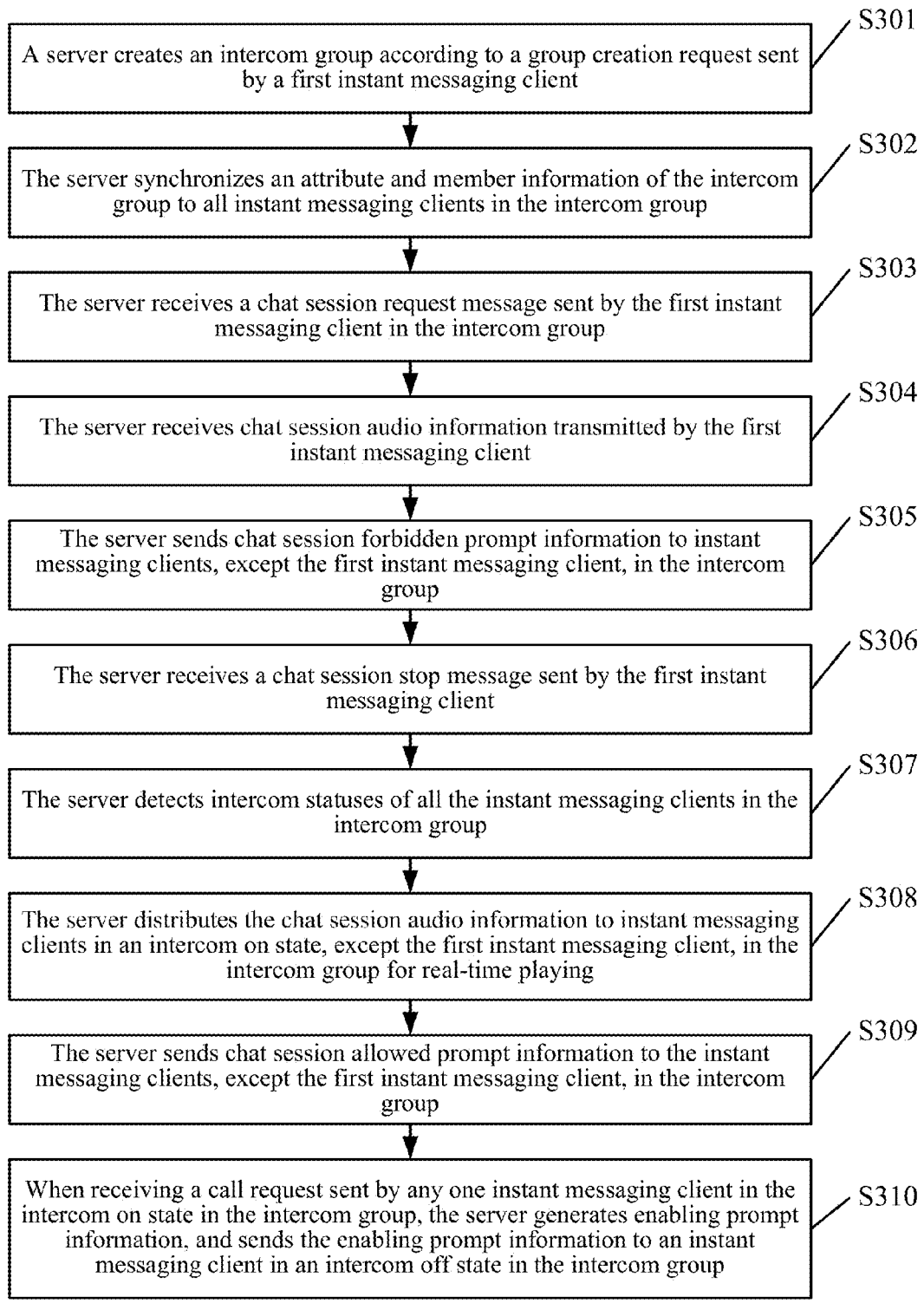
FIG. 3 is a flow chart of yet another information exchange method provided in an embodiment of the present application.

FIG. 3 is a flow chart of another information exchange method provided in an embodiment of the present application. A process of an information exchange method executed by a server is illustrated in this embodiment, and the method may include the following step S301 to step S310.

S301: A server creates an intercom group according to a group creation request sent by a first instant messaging client.

S302: The server synchronizes an attribute and member information of the intercom group to all instant messaging clients in the intercom group.

S303: The server receives a chat session request message sent by the first instant messaging client in the intercom group.

S304: The server receives chat session audio information transmitted by the first instant messaging client.

S305: The server sends chat session forbidden prompt information to instant messaging clients, except the first instant messaging client, in the intercom group.

S306: The server receives a chat session stop message sent by the first instant messaging client.

S307: The server detects intercom statuses of all the instant messaging clients in the intercom group.

S308: The server distributes the chat session audio information to instant messaging clients in an intercom on state, except the first instant messaging client, in the intercom group for real-time playing.

S309: The server sends chat session allowed prompt information to the instant messaging clients, except the first instant messaging client, in the intercom group.

In this embodiment, step S301 to step S309 may be performed with reference to step S201 to step S209 in the embodiment shown in FIG. 2, and are not described herein again.

S310: When receiving a call request sent by any one instant messaging client in the intercom on state in the intercom group, the server generates enabling prompt information, and sends the enabling prompt information to an instant messaging client in an intercom off state in the intercom group.

Any one instant messaging client in the intercom on state in the intercom group may use a call function, where the call function is used for prompting an instant messaging client in the intercom off state to enable the intercom function, so as to perform session information exchange. Specifically, any one instant messaging client in the intercom on state in the intercom group may initiate a call request, where the call request may include audio data and may not include audio date. When receiving the call request sent by any one instant messaging client in the intercom on state in the intercom group, the server generates the enabling prompt information, and pushes the enabling prompt information to an instant messaging client in the intercom off state in the intercom group. It should be noted that, if the instant messaging client in the intercom off state in the intercom group is in an online state, the instant messaging client receives and displays the enabling prompt information, and if the instant messaging client in the intercom off state in the intercom group is in an offline state, the instant messaging client receives and displays the enabling prompt information after being switched to the online state next time. The instant messaging client in the intercom off state in the intercom group may choose, according to the enabling prompt information, to enable the intercom function or not.

A difference between the embodiment shown in FIG. 3 and the embodiment shown in FIG. 2 is that, in step S210 shown in FIG. 2, the server directly forwards the call request, and prompts, through the call request, the instant messaging client in the intercom off state in the intercom group to enable the intercom function, and in step S310 shown in FIG. 3, the server generates the enabling prompt information according to the call request, and prompts, through the enabling prompt information, the instant messaging client in the intercom off state in the intercom group to enable the intercom function.

In the embodiment of the present application, a server in a network is adopted to receive chat session audio information transmitted by an instant messaging client in an intercom group and distribute the chat session audio information to other instant messaging clients, except the instant messaging client, in the intercom group for real-time playing, thereby implementing an intercom talk function between the instant messaging clients in the intercom group and saving the cost for purchasing extra two way radios and transceiver devices. In addition, information exchange is implemented based on the server in the network instead of conventional radio frequencies, thereby improving the confidentiality and stability of the information exchange.

It should be noted that the embodiment shown in FIG. 3 may also include the following implementation manner. After performing steps S301 to S303, the server may jump to perform step S307 of detecting, by the server, the intercom statuses of all the instant messaging clients in the intercom group, returning to the first instant messaging client a list of instant messaging clients in the intercom on state, except the first instant messaging client, in the intercom group, and notifying the first instant messaging client of a transmission path between each instant messaging client in the list and the first instant messaging client, so that the first instant messaging client may send the chat session audio information directly through the transmission path to each instant messaging client in the list for real-time playing. The transmission path may be a direct path between the instant messaging clients or a path connecting the instant messaging clients through another network apparatus (for example, an apparatus such as a router). Therefore, the chat session audio information of the first instant messaging client transmitted through the transmission path may not be relayed through the server, thereby reducing a communication load and a processing load of the server.

Figure 4:
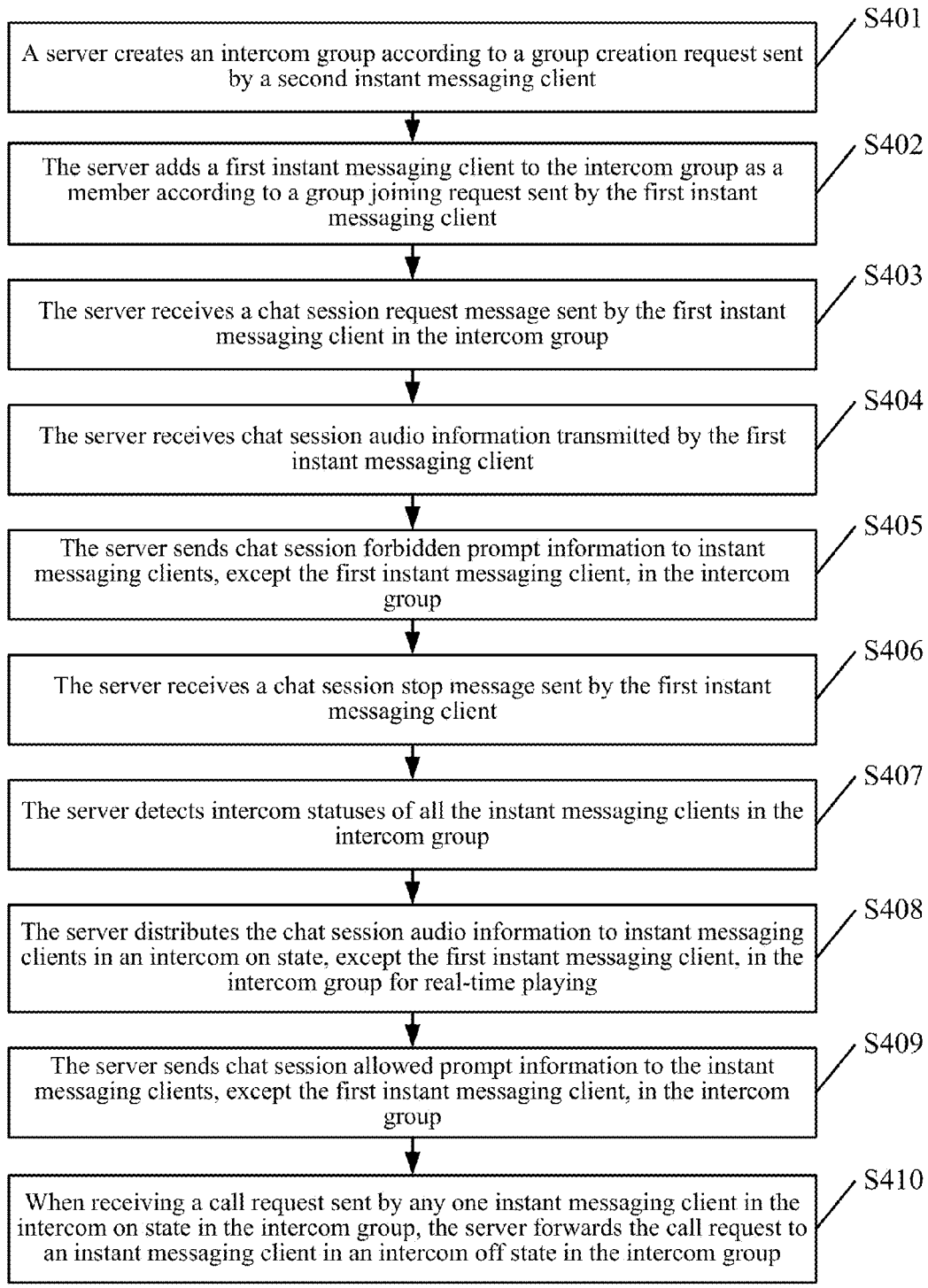
FIG. 4 is a flow chart of yet another information exchange method provided in an embodiment of the present application.

FIG. 4 is a flow chart of another information exchange method provided in an embodiment of the present application. A process of an information exchange method executed by a server is illustrated in this embodiment, and the method may include the following step S401 to step S410.

S401: A server creates an intercom group according to a group creation request sent by a second instant messaging client.

The group creation request includes: an attribute and member information of the intercom group, where the attribute of the intercom group may include an ID of the intercom group and the attribute of the intercom group may also include information such as a name, a type, a rank, and a creation time of the intercom group. The ID of the intercom group may be represented in a manner of a character string, and may also be represented in a manner of a two-dimensional bar code. A user corresponding to the second instant messaging client may request the server to create an intercom group, and the creation process is the same as a process in which the user corresponding to the first instant messaging client requests the server to create an intercom group in step S201 shown in FIG. 2.

S402: The server adds a first instant messaging client to the intercom group as a member according to a group joining request sent by the first instant messaging client.

The group joining request includes the ID of the intercom group. In specific implementation, a user corresponding to the first instant messaging client may initiate the group joining request by directly inputting the ID number of the intercom group, or the user corresponding to the first instant messaging client may initiate the group joining request by scanning a two-dimensional bar code including the ID of the intercom group.

S403: The server receives a chat session request message sent by the first instant messaging client in the intercom group.

S404: The server receives chat session audio information transmitted by the first instant messaging client.

S405: The server sends chat session forbidden prompt information to instant messaging clients, except the first instant messaging client, in the intercom group.

S406: The server receives a chat session stop message sent by the first instant messaging client.

S407: The server detects intercom statuses of all the instant messaging clients in the intercom group.

S408: The server distributes the chat session audio information to instant messaging clients in an intercom on state, except the first instant messaging client, in the intercom group for real-time playing.

S409: The server sends chat session allowed prompt information to the instant messaging clients, except the first instant messaging client, in the intercom group.

S410: When receiving a call request sent by any one instant messaging client in the intercom on state in the intercom group, the server forwards the call request to an instant messaging client in an intercom off state in the intercom group.

In this embodiment, step S403 to step S410 may be performed with reference to step S203 to step S210 shown in FIG. 2, and are not described herein again.

A difference between the embodiment shown in FIG. 4 and the embodiment shown in FIG. 2 is that, in step S201 to step S201 shown in FIG. 2, the first instant messaging client initiating the intercom function initiatively requests creation of an intercom group, so as to implement the intercom function, and in step S401 to step S402 shown in FIG. 4, the second instant messaging client requests creation of an intercom group, and the first instant messaging client initiating the intercom function requests joining the created intercom group, so as to implement the intercom function.

In the embodiment of the present application, a server in a network is adopted to receive chat session audio information transmitted by an instant messaging client in an intercom group and distribute the chat session audio information to other instant messaging clients, except the instant messaging client, in the intercom group for real-time playing, thereby implementing an intercom talk function between the instant messaging clients in the intercom group and saving the cost for purchasing extra two way radios and transceiver devices. In addition, information exchange is implemented based on the server in the network instead of conventional radio frequencies, thereby improving the confidentiality and stability of the information exchange.

It should be noted that the embodiment shown in FIG. 4 may also include the following implementation manner. After performing steps S401 to S403, the server may jump to perform step S407 of detecting, by the server, the intercom statuses of all the instant messaging clients in the intercom group, returning to the first instant messaging client a list of instant messaging clients in the intercom on state, except the first instant messaging client, in the intercom group, and notifying the first instant messaging client of a transmission path between each instant messaging client in the list and the first instant messaging client, so that the first instant messaging client may send the chat session audio information directly through the transmission path to each instant messaging client in the list for real-time playing. The transmission path may be a direct path between the instant messaging clients or a path connecting the instant messaging clients through another network apparatus (for example, an apparatus such as a router). Therefore, the chat session audio information of the first instant messaging client transmitted through the transmission path may not be relayed through the server, thereby reducing a communication load and a processing load of the server.

Figure 5:
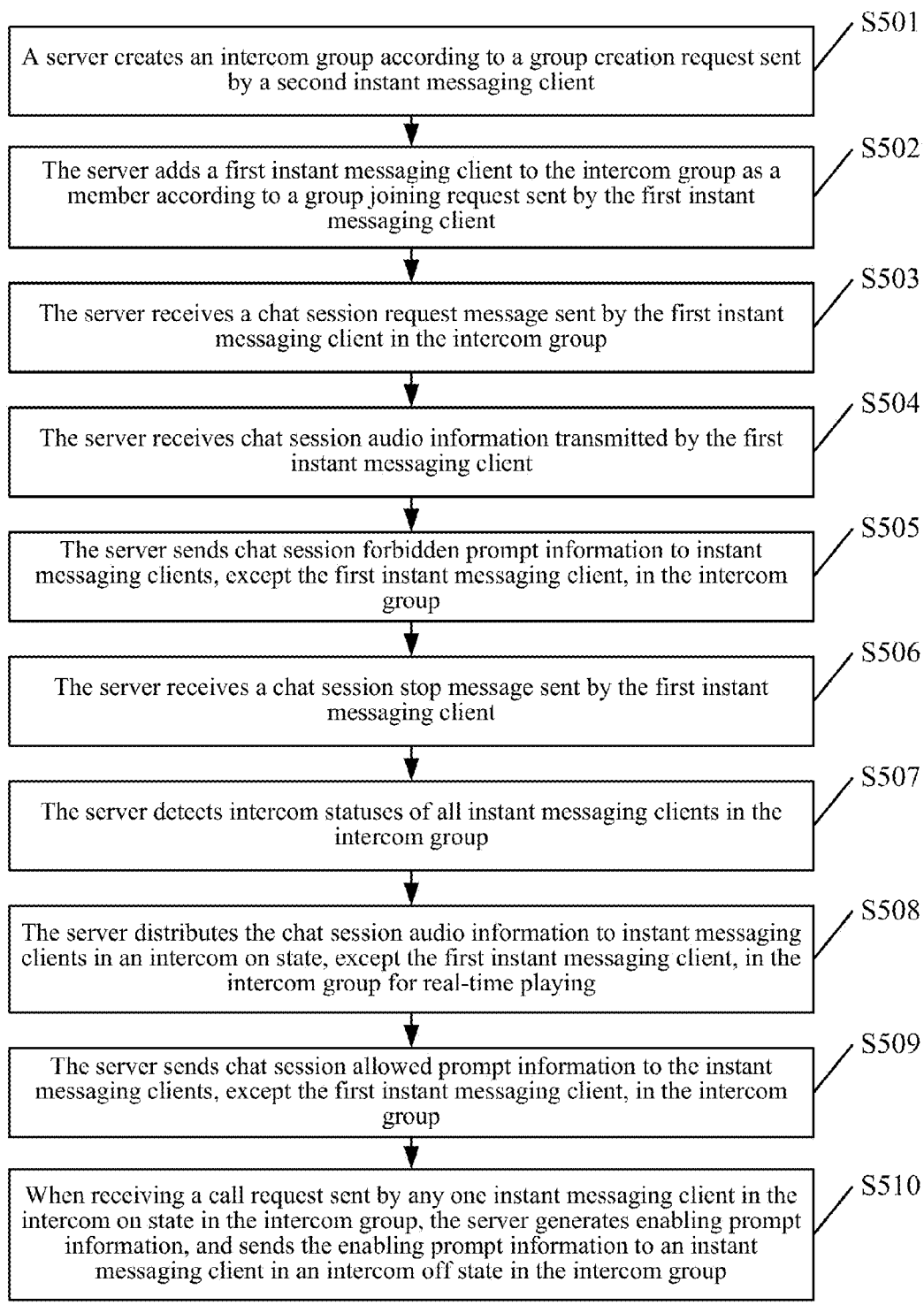
FIG. 5 is a flow chart of yet another information exchange method provided in an embodiment of the present application.

FIG. 5 is a flow chart of another information exchange method provided in an embodiment of the present application. A process of an information exchange method executed by a server is illustrated in this embodiment, and the method may include the following step S501 to step S510.

S501: A server creates an intercom group according to a group creation request sent by a second instant messaging client.

S502: The server adds a first instant messaging client to the intercom group as a member according to a group joining request sent by the first instant messaging client.

In this embodiment, step S501 and step S502 may be performed with reference to step S401 and step S402 shown in FIG. 4, and are not described herein again.

S503: The server receives a chat session request message sent by the first instant messaging client in the intercom group.

S504: The server receives chat session audio information transmitted by the first instant messaging client.

S505: The server sends chat session forbidden prompt information to instant messaging clients, except the first instant messaging client, in the intercom group.

S506: The server receives a chat session stop message sent by the first instant messaging client.

S507: The server detects intercom statuses of all instant messaging clients in the intercom group.

S508: The server distributes the chat session audio information to instant messaging clients in an intercom on state, except the first instant messaging client, in the intercom group for real-time playing.

S509: The server sends chat session allowed prompt information to the instant messaging clients, except the first instant messaging client, in the intercom group.

S510: When receiving a call request sent by any one instant messaging client in the intercom on state in the intercom group, the server generates enabling prompt information, and sends the enabling prompt information to an instant messaging client in an intercom off state in the intercom group.

In this embodiment, step S503 to step S510 may be performed with reference to step S303 to step S310 shown in FIG. 3, and are not described herein again.

A difference between the embodiment shown in FIG. 5 and the embodiment shown in FIG. 4 is that, in step S410 shown in FIG. 4, the server directly forwards the call request, and prompts, through the call request, the instant messaging client in the intercom off state in the intercom group to enable an intercom function, and in step S510 shown in FIG. 5, the server generates the enabling prompt information according to the call request, and prompts, through the enabling prompt information, the instant messaging client in the intercom off state in the intercom group to enable the intercom function.

In the embodiment of the present application, a server in a network is adopted to receive chat session audio information transmitted by an instant messaging client in an intercom group and distribute the chat session audio information to other instant messaging clients, except the instant messaging client, in the intercom group for real-time playing, thereby implementing an intercom talk function between the instant messaging clients in the intercom group and saving the cost for purchasing extra two way radios and transceiver devices. In addition, information exchange is implemented based on the server in the network instead of conventional radio frequencies, thereby improving the confidentiality and stability of the information exchange.

It should be noted that the embodiment shown in FIG. 5 may also include the following implementation manner. After performing steps S501 to S503, the server may jump to perform step S507 of detecting, by the server, the intercom statuses of all the instant messaging clients in the intercom group, returning to the first instant messaging client a list of instant messaging clients in the intercom on state, except the first instant messaging client, in the intercom group, and notifying the first instant messaging client of a transmission path between each instant messaging client in the list and the first instant messaging client, so that the first instant messaging client may send the chat session audio information directly through the transmission path to each instant messaging client in the list for real-time playing. The transmission path may be a direct path between the instant messaging clients or a path connecting the instant messaging clients through another network apparatus (for example, an apparatus such as a router). Therefore, the chat session audio information of the first instant messaging client transmitted through the transmission path may not be relayed through the server, thereby reducing a communication load and a processing load of the server.

Figure 6:
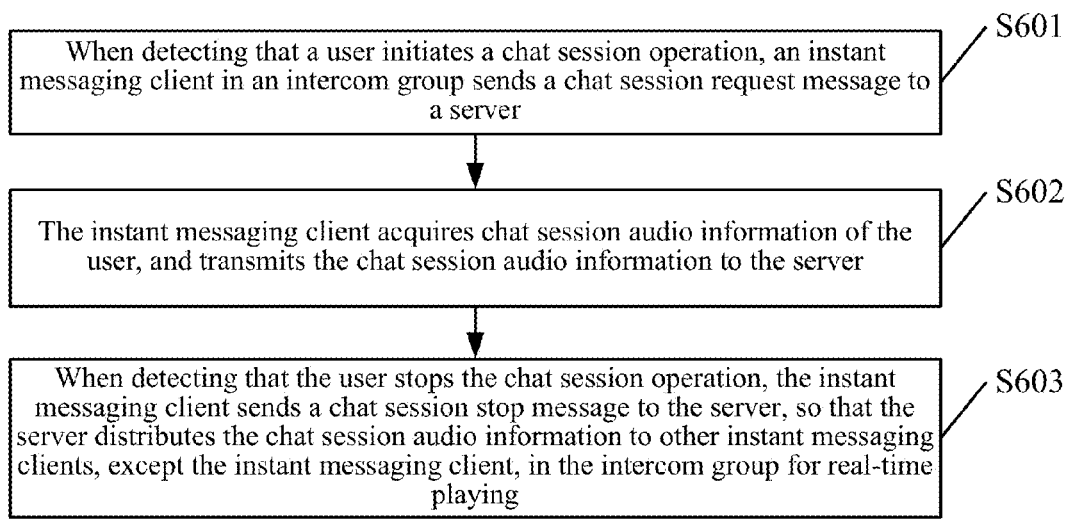
FIG. 6 is a flow chart of yet another information exchange method provided in an embodiment of the present application.

FIG. 6 is a flow chart of another information exchange method provided in an embodiment of the present application. A process of an information exchange method executed by an instant messaging client is illustrated in this embodiment, and the method may include the following step S601 to step S603.

S601: When detecting that a user initiates a chat session operation, an instant messaging client in an intercom group sends a chat session request message to a server.

When a member user in the intercom group intends to use an intercom function of an instant messaging client, the member user may initiate a chat session operation. Specifically, the instant messaging client may provide an intercom button, and when the member user pushes the intercom button, a chat session operation is initiated, and the instant messaging client sends the chat session request message to the server.

S602: The instant messaging client acquires chat session audio information of the user, and transmits the chat session audio information to the server.

The instant messaging client records the chat session audio information of the member user in real time, and uploads the chat session audio information of the member user to the server. In this step, the instant messaging client may transmit the chat session audio information to the server through a network such as Wi-Fi, GPRS, or 3G.

S603: When detecting that the user stops the chat session operation, the instant messaging client sends a chat session stop message to the server, so that the server distributes the chat session audio information to other instant messaging clients, except the instant messaging client, in the intercom group for real-time playing.

In the embodiment of the present application, a server in a network is adopted to receive chat session audio information transmitted by an instant messaging client in an intercom group and distribute the chat session audio information to other instant messaging clients, except the instant messaging client, in the intercom group for real-time playing, thereby implementing an intercom talk function between the instant messaging clients in the intercom group and saving the cost for purchasing extra two way radios and transceiver devices. In addition, information exchange is implemented based on the server in the network instead of conventional radio frequencies, thereby improving the confidentiality and stability of the information exchange.

Figure 7:
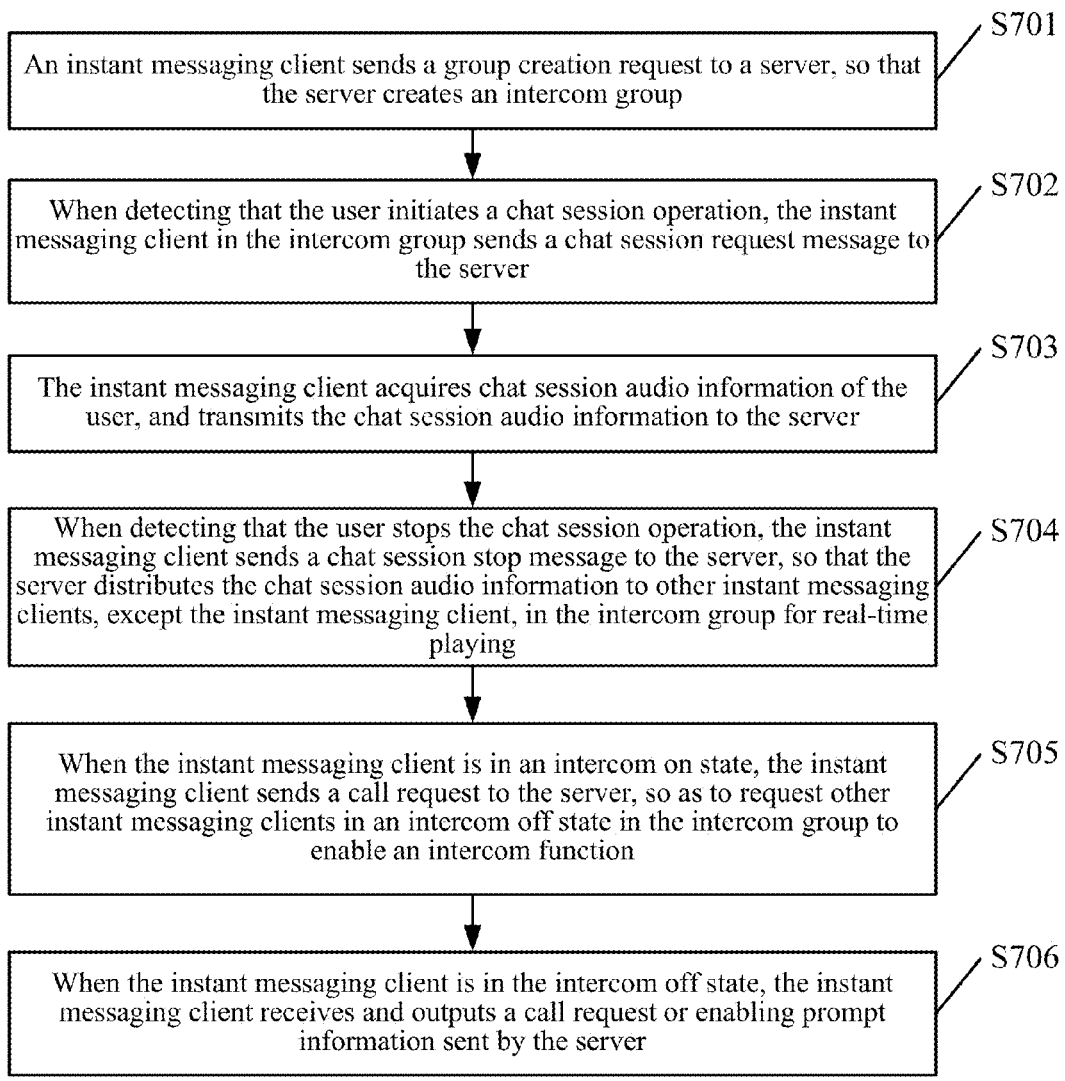
FIG. 7 is a flow chart of yet another information exchange method provided in an embodiment of the present application.

FIG. 7 is a flow chart of another information exchange method provided in an embodiment of the present application. A process of an information exchange method executed by an instant messaging client is illustrated in this embodiment, and the method may include the following step S701 to step S706.

S701: An instant messaging client sends a group creation request to a server, so that the server creates an intercom group.

The group creation request includes: an attribute and member information of the intercom group, where the attribute of the intercom group may include an ID of the intercom group and the attribute of the intercom group may also include information such as a name, a type, a rank, and a creation time of the intercom group. The ID of the intercom group may be represented in a manner of a character string, and may also be represented in a manner of a two-dimensional bar code. A user corresponding to the instant messaging client may initiatively create an intercom group. Specifically, the user may input attributes of an intercom group to be created into the instant messaging client, such as a name, a type, and an ID, and the user may also select a member for the intercom group to be created. Selection of a member may include the following implementation manners. In a first implementation manner, the user may select a contact from an instant messaging group, to which the user belongs, as a member of the intercom group. In a second implementation manner, the user may select a contact from instant messaging contacts of the user as a member of the intercom group. In this step, the instant messaging client generates the group creation request according to the attribute and member information of the intercom group input by the user, and sends the group creation request to the server, so as to create the intercom group.

S702: When detecting that the user initiates a chat session operation, the instant messaging client in the intercom group sends a chat session request message to the server. This step may be performed with reference to step S601 shown in FIG. 6, and is not described herein again.

S703: The instant messaging client acquires chat session audio information of the user, and transmits the chat session audio information to the server.

A feasible implementation manner of this step is: acquiring, by the instant messaging client, the chat session audio information of the user through an audio recording application at the local end, where, for example, the instant messaging client may provide an intercom button, and when the user pushes the intercom button, the instant messaging client invokes the audio recording application of the instant messaging client to record the chat session audio information of the user; and transmitting, by the instant messaging client, the chat session audio information to the server through a network such as Wi-Fi, GPRS, or 3G. Another feasible implementation manner of this step is: controlling, by the instant messaging client, an external apparatus (for example, an apparatus such as a microphone or a two way radio) connected to the instant messaging client to acquire the chat session audio information of the user, where, for example, the instant messaging client may provide an intercom button, and when the user pushes the intercom button, the instant messaging client sends recording control information to the external apparatus connected to the instant messaging client to control the external apparatus to record the chat session audio information of the user, and acquires the chat session audio information recorded by the external apparatus; and transmitting, by the instant messaging client, the chat session audio information to the server through a network such as Wi-Fi, GPRS, or 3G.

S704: When detecting that the user stops the chat session operation, the instant messaging client sends a chat session stop message to the server, so that the server distributes the chat session audio information to other instant messaging clients, except the instant messaging client, in the intercom group for real-time playing.

S705: When the instant messaging client is in an intercom on state, the instant messaging client sends a call request to the server, so as to request other instant messaging clients in an intercom off state in the intercom group to enable an intercom function.

In actual application, the instant messaging client may provide an on/off button, and an operation performed by the user on the on/off button may turn on or turn off an intercom status of the instant messaging client. Specifically, the instant messaging client may enable the intercom function of the instant messaging client according to an operation of enabling the intercom function by the user, so that the instant messaging client is in the intercom on state; or the instant messaging client may disable the intercom function of the instant messaging client according to an operation of disabling the intercom function by the user, so that the instant messaging client is in the intercom off state. The instant messaging client reports an intercom status to the server. When the instant messaging client is in the intercom on state, the instant messaging client sends a call request to the server, so as to request other instant messaging clients in the intercom off state in the intercom group to enable the intercom function. It should be noted that, after receiving the call request, the server may directly forward the call request, or generate enabling prompt information according to the call request.

S706: When the instant messaging client is in the intercom off state, the instant messaging client receives and outputs a call request or enabling prompt information sent by the server. After receiving the call request or the enabling prompt information, the instant messaging client displays the call request or the enabling prompt information, so as to prompt the user to enable the intercom function.

In the embodiment of the present application, a server in a network is adopted to receive chat session audio information transmitted by an instant messaging client in an intercom group and distribute the chat session audio information to other instant messaging clients, except the instant messaging client, in the intercom group for real-time playing, thereby implementing an intercom talk function between the instant messaging clients in the intercom group and saving the cost for purchasing extra two way radios and transceiver devices. In addition, information exchange is implemented based on the server in the network instead of conventional radio frequencies, thereby improving the confidentiality and stability of the information exchange.

It should be noted that the embodiment shown in FIG. 7 may also include the following implementation manner: after the instant messaging client performs steps S701 and S702, if the instant messaging client receives a list of instant messaging clients in the intercom on state, except the first instant messaging client, in the intercom group sent by the server and a transmission path between each instant messaging client in the list and the first instant messaging client notified by the server, sending, by the first instant messaging client, the chat session audio information directly through the transmission path to each instant messaging client in the list for real-time playing. The transmission path may be a direct path between the instant messaging clients or a path connecting the instant messaging clients through another network apparatus (for example, an apparatus such as a router). Therefore, the chat session audio information of the first instant messaging client transmitted through the transmission path may not be relayed through the server, thereby reducing a communication load and a processing load of the server.

Figure 8:
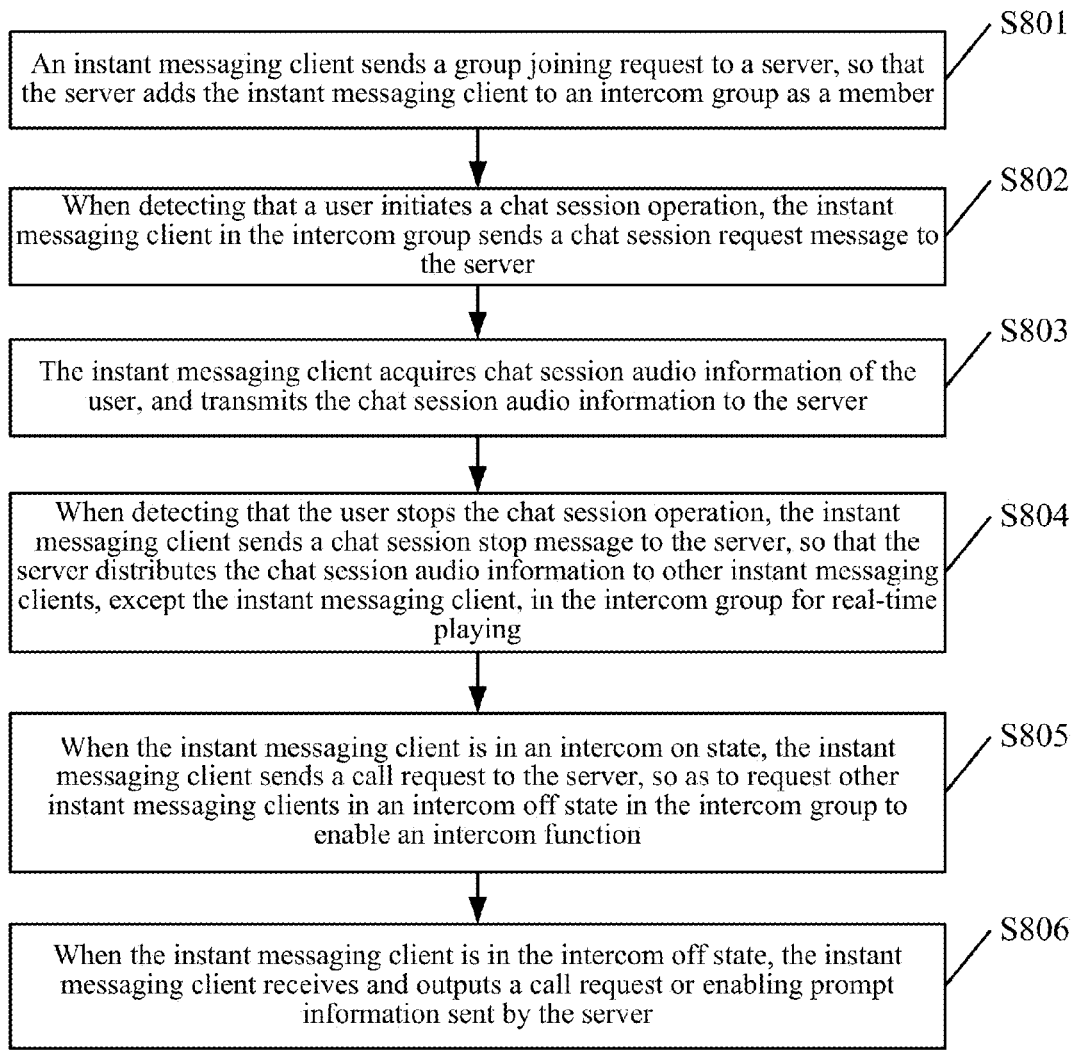
FIG. 8 is a flow chart of yet another information exchange method provided in an embodiment of the present application.

FIG. 8 is a flow chart of another information exchange method provided in an embodiment of the present application. A process of an information exchange method executed by an instant messaging client is illustrated in this embodiment, and the method may include the following step S801 to step S806.

S801: An instant messaging client sends a group joining request to a server, so that the server adds the instant messaging client to an intercom group as a member.

S802: When detecting that a user initiates a chat session operation, the instant messaging client in the intercom group sends a chat session request message to the server.

S803: The instant messaging client acquires chat session audio information of the user, and transmits the chat session audio information to the server.

S804: When detecting that the user stops the chat session operation, the instant messaging client sends a chat session stop message to the server, so that the server distributes the chat session audio information to other instant messaging clients, except the instant messaging client, in the intercom group for real-time playing.

S805: When the instant messaging client is in an intercom on state, the instant messaging client sends a call request to the server, so as to request other instant messaging clients in an intercom off state in the intercom group to enable an intercom function.

S806: When the instant messaging client is in the intercom off state, the instant messaging client receives and outputs a call request or enabling prompt information sent by the server.

A difference between the embodiment shown in FIG. 8 and the embodiment shown in FIG. 7 is that, in step S701 shown in FIG. 7, the instant messaging client initiating the intercom function initiatively requests creation of an intercom group, so as to implement the intercom function, and in step S801 shown in FIG. 8, another instant messaging client requests creation of an intercom group, and the instant messaging client initiating the intercom function requests joining the created intercom group, so as to implement the intercom function.

In the embodiment of the present application, a server in a network is adopted to receive chat session audio information transmitted by an instant messaging client in an intercom group and distribute the chat session audio information to other instant messaging clients, except the instant messaging client, in the intercom group for real-time playing, thereby implementing an intercom talk function between the instant messaging clients in the intercom group and saving the cost for purchasing extra two way radios and transceiver devices. In addition, information exchange is implemented based on the server in the network instead of conventional radio frequencies, thereby improving the confidentiality and stability of the information exchange.

It should be noted that the embodiment shown in FIG. 8 may also include the following implementation manner: after the instant messaging client performs steps S801 and S802, if the instant messaging client receives a list of instant messaging clients in the intercom on state, except the first instant messaging client, in the intercom group sent by the server and a transmission path between each instant messaging client in the list and the first instant messaging client notified by the server, sending, by the first instant messaging client, the chat session audio information directly through the transmission path to each instant messaging client in the list for real-time playing. The transmission path may be a direct path between the instant messaging clients or a path connecting the instant messaging clients through another network apparatus (for example, an apparatus such as a router). Therefore, the chat session audio information of the first instant messaging client transmitted through the transmission path may not be relayed through the server, thereby reducing a communication load and a processing load of the server.

A specific example is taken in the following to specifically illustrate a process of an information exchange method interactively performed by an instant messaging client and a server.

It is assumed that a user A logs into an instant messaging application through a cell phone A, a user B logs into the instant messaging application through a cell phone B, a user C logs into the instant messaging application through a cell phone C, and a user D logs into the instant messaging application through a cell phone D. The user A and the user B belong to the same instant messaging group, the user C is an instant messaging contact of the user A, and the user D and the user A are strangers to each other. It is assumed that the user A initiates an intercom function, and an information exchange process of this embodiment is as follows.

The user A inputs an attribute of an intercom group to be created into the cell phone A, such as a name, a type, and an ID, and selects the user B from the instant messaging group and the user C from instant messaging contacts as members of the intercom group. The cell phone A sends a group creation request to a server, and the server creates an intercom group. At this time, members included in the intercom group are the user A, the user B, and the user C. The server sends the attribute of the intercom group and information about the users A, B, and C to the cell phones A, B, and C. The user D may input a character string of the ID of the intercom group into the cell phone D or scan a two-dimensional bar code including the ID of the intercom group, and sends a group joining request to the server through the cell phone D. The server takes the user D as a member, adds the user D to the intercom group, sends information about the user D to the cell phones A, B, and C, and sends the attribute of the intercom group and the information about the users A, B, C, and D to the cell phone D. The users A, B, C, and D may all view the attribute and the member information of the intercom group through the respective cell phones.

When the user A pushes an intercom button of the cell phone A and initiates a chat session operation, the cell phone A sends a chat session request message to the server. After receiving the chat session request message of the cell phone A, the server sends chat session forbidden prompt information to the cell phones B, C, and D, and the cell phones B, C, and D may set respective intercom buttons to an unavailable state, so that none of the users B, C, and D can initiate a chat session operation. In a process in which the user A pushes the intercom button of the cell phone A, the cell phone A invokes an audio recording application in the cell phone A or controls an external apparatus (for example, an apparatus such as a microphone or a two way radio) connected to the cell phone A to record chat session audio information of the user A, and the cell phone A transmits the chat session audio information to the server in real time. When the user A releases the intercom button of the cell phone A and initiates a chat session stop operation, the cell phone A sends a chat session stop message to the server, and the server detects intercom statuses of the cell phones B, C, and D. If detecting that the cell phones B and C are both in an intercom on state and the cell phone D is in an intercom off state, the server distributes the chat session audio information of the user A to the cell phones B and C for real-time playing. After receiving the chat session stop message, the server sends chat session allowed prompt information to the cell phones B, C, and D, and the cell phones B, C, and D may adjust the respective intercom buttons to an available state, so that any one of the users B, C, and D can initiate a chat session operation.

Any one of the cell phones A, B, and C can initiate a call function. When it is assumed that the user B sends a call request to the server through the cell phone B, the server forwards the call request to the cell phone D, or the server generates enabling prompt information according to the call request and sends the enabling prompt information to the cell phone D. The cell phone D displays the call request or the enabling prompt information, so as to prompt the user D to enable the intercom function of the cell phone D.

Through description of the above method embodiment, in the embodiment of the present application, a server in a network is adopted to receive chat session audio information transmitted by an instant messaging client in an intercom group and distribute the chat session audio information to other instant messaging clients, except the instant messaging client, in the intercom group for real-time playing, thereby implementing an intercom talk function between the instant messaging clients in the intercom group and saving the cost for purchasing extra two way radios and transceiver devices. In addition, information exchange is implemented based on the server in the network instead of conventional radio frequencies, thereby improving the confidentiality and stability of the information exchange.

It should be noted that the above specific example may also include the following implementation manner: after the cell phone A sends the chat session request message to the server, detecting, by the server, intercom statuses of the cell phones B, C, and D, if detecting that the cell phones B and C are both in an intercom on state and the cell phone D is in an intercom off state, returning, by the server, a list of instant messaging clients to the cell phone A, where the list includes the cell phones B and C in the intercom on state, and notifying the cell phone A of a transmission path between the cell phone A and the cell phone B and a transmission path between the cell phone A and the cell phone C. The cell phone A may send the chat session audio information of the user A directly through the transmission paths to the cell phones B and C for real-time playing. The transmission paths may be direct paths between the cell phone A and the cell phone B and between the cell phone A and the cell phone C or paths connecting the cell phone A and the cell phone B and connecting the cell phone A and the cell phone C through other network apparatuses (for example, an apparatus such as a router). Therefore, the chat session audio information of the user A transmitted through the transmission paths may not be relayed through the server, thereby reducing a communication load and a processing load of the server.

A server provided in an embodiment of the present application is introduced in detail in the following with reference to accompanying drawings FIG. 9 to FIG. 12. It should be noted that the server described in the following may be applied to the above method.

Figure 9:
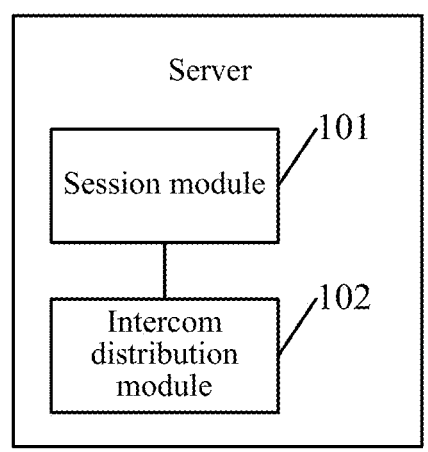
FIG. 9 is a schematic structural diagram of a server provided in an embodiment of the present application.

FIG. 9 is a schematic structural diagram of a server provided in an embodiment of the present application. The server includes: a session module 101 and an intercom distribution module 102, where the session module 101 is configured to, when receiving a chat session request message sent by a first instant messaging client in an intercom group, receive chat session audio information transmitted by the first instant messaging client, where the first instant messaging client is any one instant messaging client in the intercom group; and the intercom distribution module 102 is configured to, when receiving a chat session stop message sent by the first instant messaging client, distribute the chat session audio information to instant messaging clients, except the first instant messaging client, in the intercom group for real-time playing.

Figure 10:
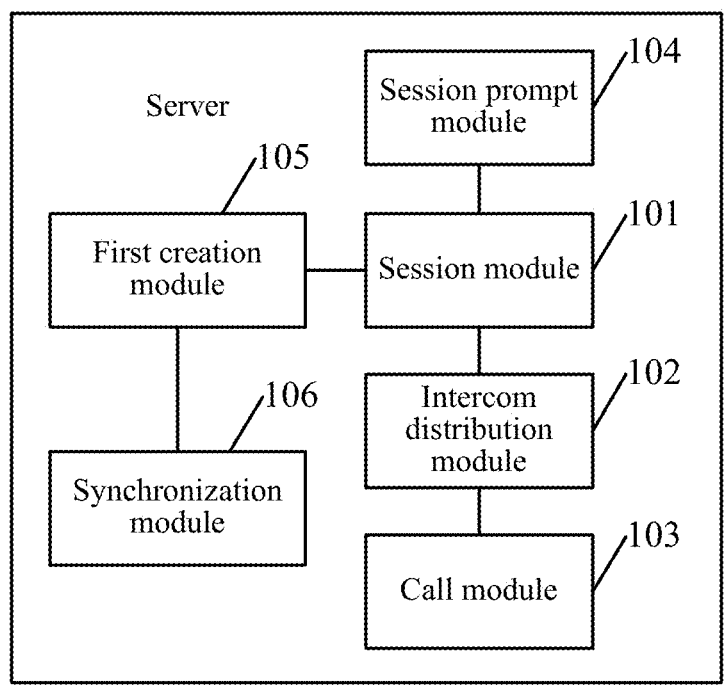
FIG. 10 is a schematic structural diagram of another server provided in an embodiment of the present application.

FIG. 10 is a schematic structural diagram of another server provided in an embodiment of the present application. The server may include: a session module 101, an intercom distribution module 102, a call module 103, a session prompt module 104, a first creation module 105, and a synchronization module 106, where structures of the session module 101 and the intercom distribution module 102 may be obtained with reference to relevant description of the embodiment shown in FIG. 9, and are not described herein again.

The call module 103 is configured to, when receiving a call request sent by any one instant messaging client in an intercom on state in the intercom group, forward the call request to an instant messaging client in an intercom off state in the intercom group, or configured to, when receiving a call request sent by any one instant messaging client in an intercom on state in the intercom group, generate enabling prompt information, and send the enabling prompt information to an instant messaging client in an intercom off state in the intercom group.

The session prompt module 104 is configured to, after receiving a chat session request message sent by a first instant messaging client in an intercom group, send chat session forbidden prompt information to instant messaging clients, except the first instant messaging client, in the intercom group, and configured to, after receiving a chat session stop message sent by the first instant messaging client, send chat session allowed prompt information to the instant messaging clients, except the first instant messaging client, in the intercom group.

The first creation module 105 is configured to create the intercom group according to a group creation request sent by the first instant messaging client.

The group creation request includes: an attribute and member information of the intercom group, where the attribute of the intercom group may include an ID of the intercom group and the attribute of the intercom group may also include information such as a name, a type, a rank, and a creation time of the intercom group. The ID of the intercom group may be represented in a manner of a character string, and may also be represented in a manner of a two-dimensional bar code.

The synchronization module 106 is configured to synchronize the attribute and member information of the intercom group to all instant messaging clients in the intercom group.

It should be noted that a user not belonging to the intercom group may request joining the intercom group, and a member user in the intercom group may perform a group exiting operation, so as to exit the intercom group. The synchronization module 106 updates the member information about the intercom group in real time according to a joining operation of a user not belonging to the intercom group and/or a group exiting operation of a member user of the intercom group, and synchronizes the updated member information about the intercom group to the instant messaging clients in the intercom group.

Figure 11:
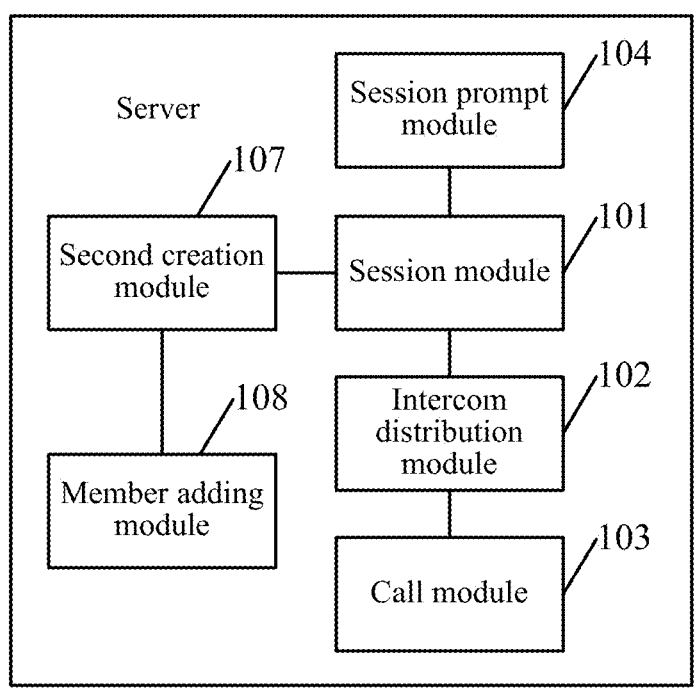
FIG. 11 is a schematic structural diagram of yet another server provided in an embodiment of the present application.

FIG. 11 is a schematic structural diagram of another server provided in an embodiment of the present application. The server may include: a session module 101, an intercom distribution module 102, a call module 103, a session prompt module 104, a second creation module 107, and a member adding module 108, where structures of the session module 101 and the intercom distribution module 102 may be obtained with reference to relevant description of the embodiment shown in FIG. 9, and are not described herein again.

The second creation module 107 is configured to create an intercom group according to a group creation request sent by a second instant messaging client.

The group creation request includes: an attribute and member information of the intercom group, where the attribute of the intercom group may include an ID of the intercom group and the attribute of the intercom group may also include information such as a name, a type, a rank, and a creation time of the intercom group. The ID of the intercom group may be represented in a manner of a character string, and may also be represented in a manner of a two-dimensional bar code.

The member adding module 108 is configured to add a first instant messaging client to the intercom group as a member according to a group joining request sent by the first instant messaging client.

The group joining request includes the ID of the intercom group. In specific implementation, a user corresponding to the first instant messaging client may initiate the group joining request by directly inputting the ID number of the intercom group, or the user corresponding to the first instant messaging client may initiate the group joining request by scanning a two-dimensional bar code including the ID of the intercom group. The member adding module 108 adds the first instant messaging client to the intercom group as a member.

Figure 12:
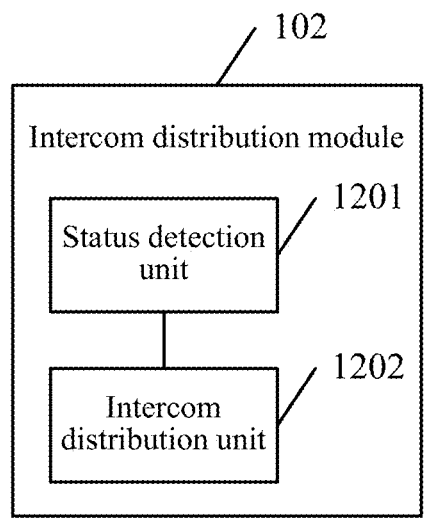
FIG. 12 is a schematic structural diagram of an intercom distribution module provided in an embodiment of the present application.

FIG. 12 is a schematic structural diagram of an intercom distribution module provided in an embodiment of the present application. The intercom distribution module 102 may include: a status detection unit 1201 and an intercom distribution unit 1202.

The status detection unit 1201 is configured to, when receiving a chat session stop message sent by a first instant messaging client, detect intercom statuses of all instant messaging clients in an intercom group, where the intercom status includes an intercom on state or an intercom off state.

A server manages and maintains statuses of the instant messaging clients in the intercom group, which include a login status and an intercom status, where the login status includes an online state (including an online state, an away state, and an invisible state) or an offline state, and the intercom status includes an intercom on state or an intercom off state. It should be noted that, when an instant messaging client is in the intercom on state, it is indicated that the instant messaging client is currently in the online state and is allowed to receive chat session audio information, and when an instant messaging client is in the intercom off state, it is indicated that the instant messaging client is currently in the offline state and cannot receive chat session audio information, or the instant messaging client is currently in the online state but refuses to receive chat session audio information. The instant messaging clients in the intercom group report their own intercom statuses to the server, and the server stores the intercom statuses of the instant messaging clients in the intercom group, and timely updates stored content according to a change of the intercom statuses of the instant messaging clients. The status detection unit 1201 may read the intercom statuses of all the instant messaging clients in the intercom group from the content stored in the server.

The intercom distribution unit 1202 is configured to distribute the chat session audio information to instant messaging clients in the intercom on state, except the first instant messaging client, in the intercom group for real-time playing.

The intercom distribution unit 1202 selects an instant messaging client in the intercom on state from all instant messaging clients, except the first instant messaging client, in the intercom group, establishes a transmission connection, and transmits the chat session audio information, sent by the first instant messaging client, to the selected instant messaging client for real-time playing, thereby implementing the intercom function between the instant messaging clients in the intercom group.

It should be noted that the structures and functions of the servers in the embodiments shown in FIG. 9 to FIG. 12 may be specifically implemented through the methods in the method embodiments shown in FIG. 1 to FIG. 5, and the specific implementation process may be obtained with reference to relevant description in the above method, and is not described herein again.

Through description of the embodiment about the server, in the embodiment of the present application, a server in a network is adopted to receive chat session audio information transmitted by an instant messaging client in an intercom group and distribute the chat session audio information to other instant messaging clients, except the instant messaging client, in the intercom group for real-time playing, thereby implementing an intercom talk function between the instant messaging clients in the intercom group and saving the cost for purchasing extra two way radios and transceiver devices. In addition, information exchange is implemented based on the server in the network instead of conventional radio frequencies, thereby improving the confidentiality and stability of the information exchange.

An instant messaging client provided in an embodiment of the present application is introduced in detail in the following with reference to accompanying drawings FIG. 13 to FIG. 15. It should be noted that the instant messaging client described in the following may be applied to the above method.

Figure 13:
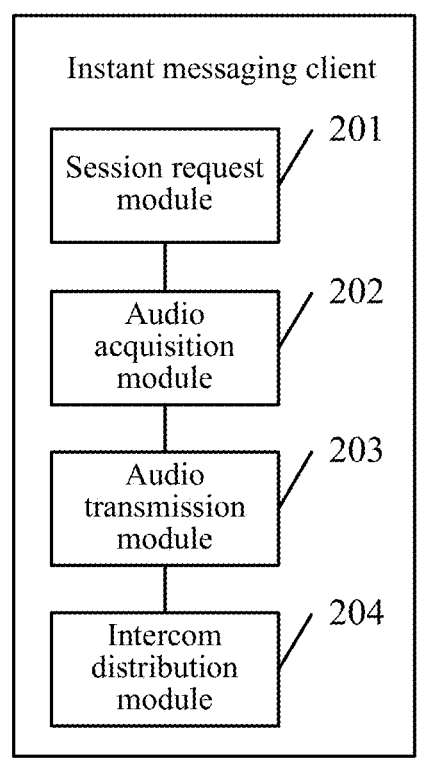
FIG. 13 is a schematic structural diagram of an instant messaging client provided in an embodiment of the present application.

FIG. 13 is a schematic structural diagram of an instant messaging client provided in an embodiment of the present application. The instant messaging client may include: a chat session request module 201, an audio acquisition module 202, an audio transmission module 203, and an intercom distribution module 204.

The chat session request module 201 is configured to, when detecting that a user initiates a chat session operation, send a chat session request message to a server.

When a member user in an intercom group intends to use an intercom function of an instant messaging client, the member user may initiate a chat session operation. Specifically, the instant messaging client may provide an intercom button, and when the member user pushes the intercom button, a chat session operation is initiated, and the chat session request module 201 sends a chat session request message to the server.

The audio acquisition module 202 is configured to acquire chat session audio information of the user.

The audio acquisition module 202 is specifically configured to acquire the chat session audio information of the user through an audio recording application of the instant messaging client, or acquire the chat session audio information of the user by controlling an external apparatus (for example, an apparatus such as a microphone or a two way radio) connected to the instant messaging client.

The audio transmission module 203 is configured to transmit the chat session audio information to the server.

The intercom distribution module 204 is configured to, when detecting that the user stops the chat session operation, send a chat session stop message to the server, so that the server distributes the chat session audio information to other instant messaging clients, except the instant messaging client, in the intercom group for real-time playing.

Figure 14:
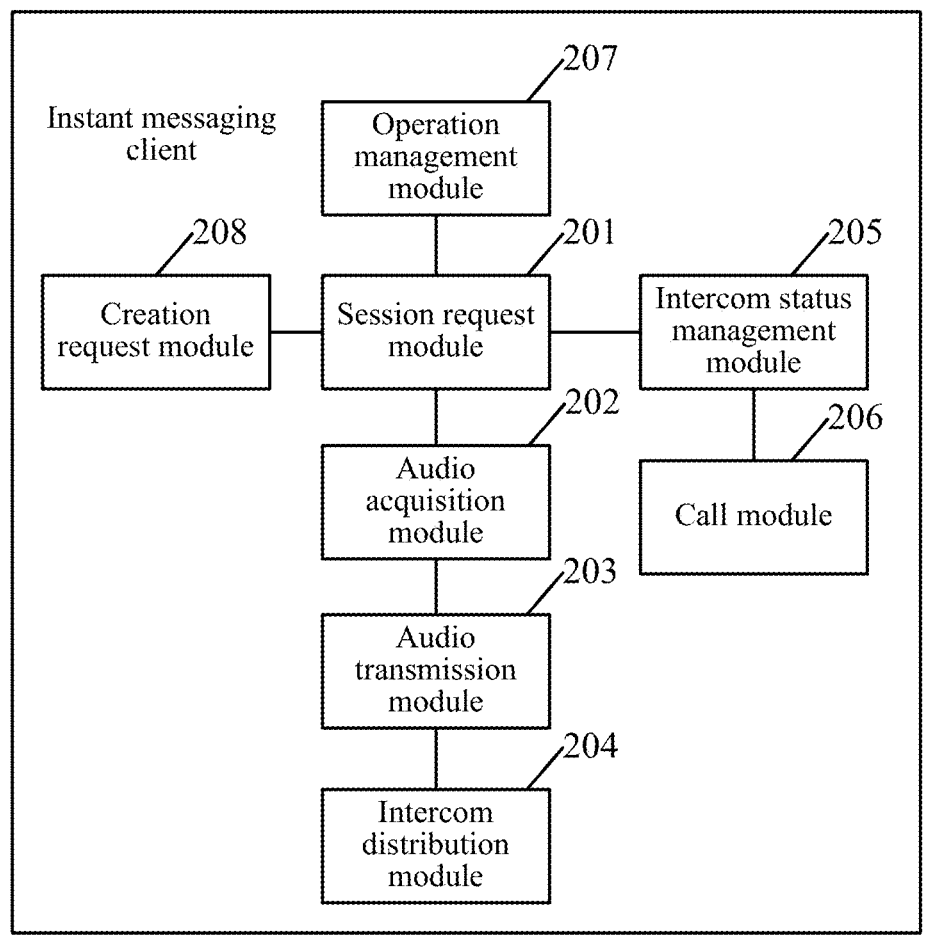
FIG. 14 is a schematic structural diagram of another instant messaging client provided in an embodiment of the present application.

FIG. 14 is a schematic structural diagram of another instant messaging client provided in an embodiment of the present application. The instant messaging client may include: a chat session request module 201, an audio acquisition module 202, an audio transmission module 203, an intercom distribution module 204, an intercom status management module 205, a call module 206, an operation management module 207, and a creation request module 208, where structures of the chat session request module 201, the audio acquisition module 202, the audio transmission module 203, and the intercom distribution module 204 may be obtained with reference to relevant description in the embodiment shown in FIG. 13, and are not described herein again.

The intercom status management module 205 is configured to enable an intercom function of the instant messaging client according to an operation of enabling the intercom function by the user, so that the instant messaging client is in an intercom on state, and configured to disable the intercom function of the instant messaging client according to an operation of disabling the intercom function by the user, so that the instant messaging client is in an intercom off state.

The call module 206 is configured to, when the instant messaging client is in the intercom on state, send a call request to the server, so as to request other instant messaging clients in the intercom off state in the intercom group to enable the intercom function, or configured to, when the instant messaging client is in the intercom off state, receive and output a call request or enabling prompt information sent by the server.

The operation management module 207 is configured to, when receiving chat session forbidden prompt information sent by the server, forbid the user to initiate a chat session operation, and configured to, when receiving chat session allowed prompt information sent by the server, allow the user to initiate a chat session operation.

The creation request module 208 is configured to send a group creation request to the server, so that the server creates an intercom group, where the group creation request includes an attribute of the intercom group, and the attribute of the intercom group includes an ID of the intercom group.

Figure 15:
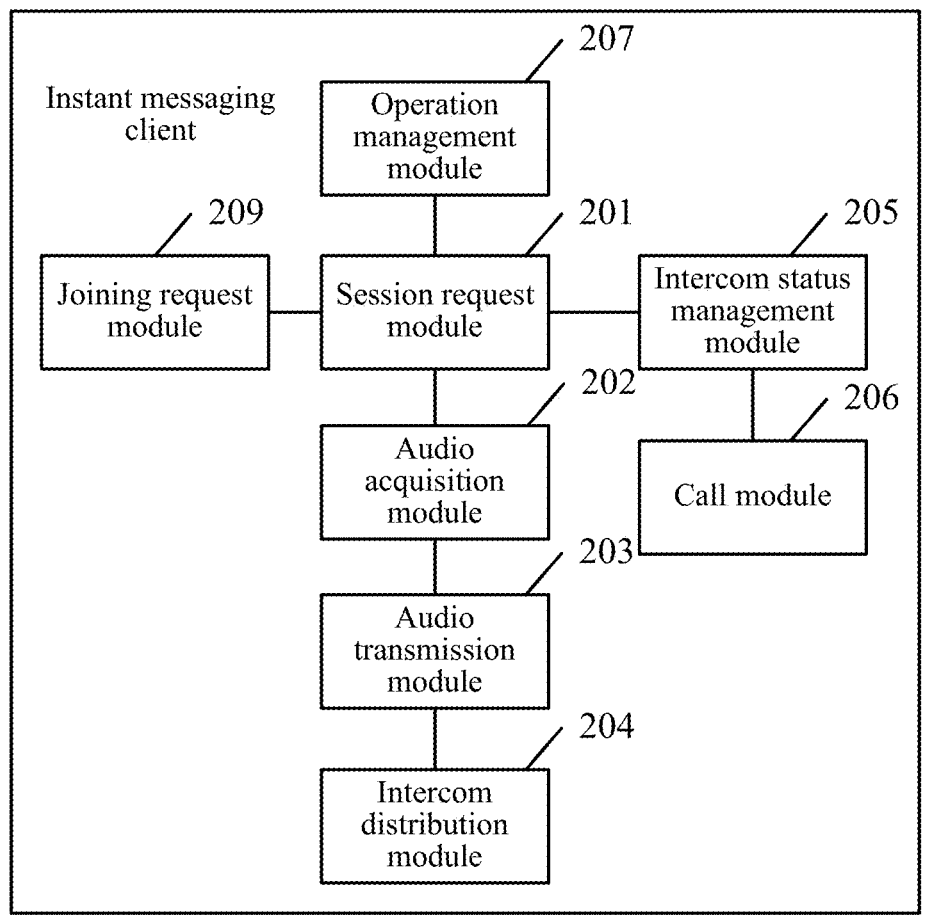
FIG. 15 is a schematic structural diagram of yet another instant messaging client provided in an embodiment of the present application.

FIG. 15 is a schematic structural diagram of yet another instant messaging client provided in an embodiment of the present application. The instant messaging client may include: a chat session request module 201, an audio acquisition module 202, an audio transmission module 203, an intercom distribution module 204, an intercom status management module 205, a call module 206, an operation management module 207, and a joining request module 209, where structures of the chat session request module 201, the audio acquisition module 202, the audio transmission module 203, the intercom distribution module 204, the intercom status management module 205, the call module 206, and the operation management module 207 may be obtained with reference to relevant description in the embodiment shown in FIG. 14, and are not described herein again.

The joining request module 209 is configured to send a group joining request to the server, so that the server adds the instant messaging client to the intercom group as a member, where the group joining request includes the ID of the intercom group.

It should be noted that the structures and functions of the instant messaging clients in the embodiment shown in FIG. 13 to FIG. 15 may be specifically implemented through the methods in the method embodiments shown in FIG. 6 to FIG. 8, and the specific implementation process may be obtained with reference to relevant description in the above method, and is not described herein again.

Through description of the embodiment about the instant messaging client, in the embodiment of the present application, a server in a network is adopted to receive chat session audio information transmitted by an instant messaging client in an intercom group and distribute the chat session audio information to other instant messaging clients, except the instant messaging client, in the intercom group for real-time playing, thereby implementing an intercom talk function between the instant messaging clients in the intercom group and saving the cost for purchasing extra two way radios and transceiver devices. In addition, information exchange is implemented based on the server in the network instead of conventional radio frequencies, thereby improving the confidentiality and stability of the information exchange.

Also disclosed in an embodiment of the present application is an information exchange system, which includes a server and at least two instant messaging clients, where the server may be obtained with reference to relevant description of the embodiments shown in FIG. 9 to FIG. 12, and is not described herein again, and the instant messaging client may be obtained with reference to relevant description of the embodiments shown in FIG. 13 to FIG. 15, and is not described herein again. It should be noted that the information exchange system in the embodiment of the present application may be applied to the method embodiments shown in FIG. 1 to FIG. 8.

In some embodiments, the present application discloses a client-server environment enabling a group of users of a chat session to communicate with one another through real-time audio broadcasting using an instant messaging client at a mobile device. FIGS. 16A to 16J are exemplary screenshots of an instant messaging client in accordance with some embodiments.

Figures 16A, 16B, 16C, 16D:
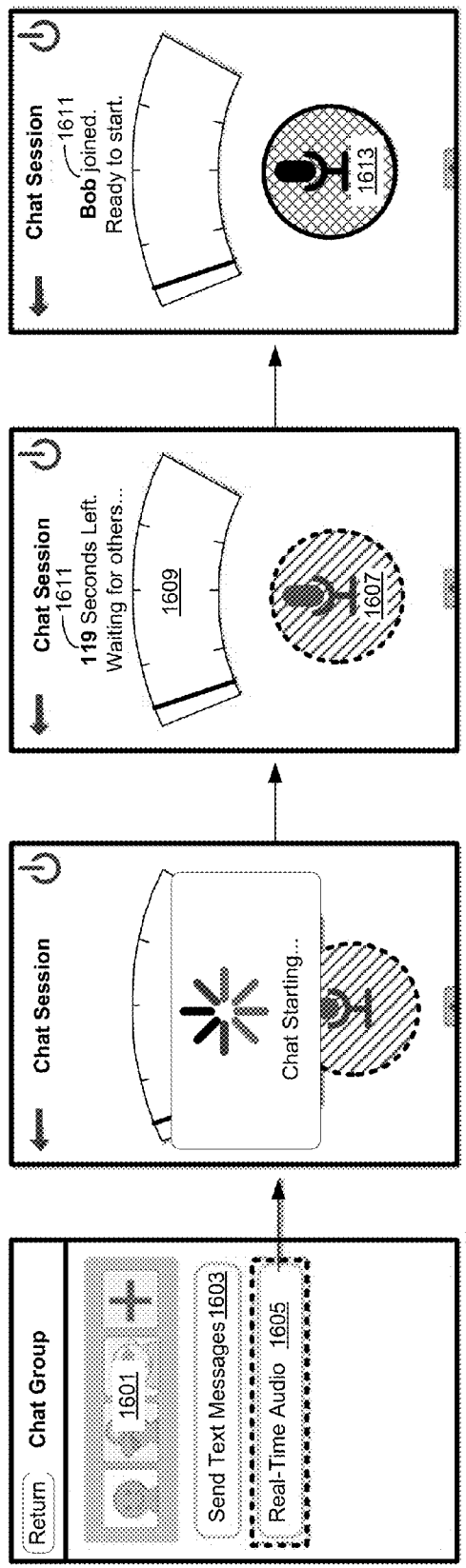
FIGS. 16A to 16J are exemplary screenshots of an instant messaging client in accordance with some embodiments of the present application

FIG. 16A is a screenshot of a chat group associated with the instant messaging client. The chat group includes one or more group users 1601. There are multiple ways for the group users to communicate with each other. For example, by pressing the "Send Text Messages" button 1603, a user of the instant messaging client can send and receive text messages to one another. Alternatively, the user can send audio/video messages to others in the same chat group by pressing a corresponding button on the mobile device. Whether a message is text-based, audio-based, or video-based, there is usually a short time delay between the generation of the message at the source and the arrival of the message at the destination. However, as the wireless network communication's bandwidth keeps increasing, the time delay is too small to be noticeable and the user feels like that the communication is conducted in "real time" fashion. As shown in FIG. 16A, the "Real-Time Audio" button 1605 provides a new feature that allows the user to communicate with others in the chat group through real-time audio broadcast. An important feature of the real-time audio broadcast is that the server system sets a limit such that only one user can send out real-time audio broadcast at a time while the other users are listeners of the real-time audio broadcast. When this user finishes his/her real-time audio broadcast, the server system can allow another user to start his/her own real-time audio broadcast.

FIG. 16B depicts a screenshot of the instant messaging client after the user presses the "Real-Time Audio" button 1605, which has an alert message "Chat Starting" indicating that a chat session start request has been sent to and is being processed by the server system. In response to the request, the server system allocates resources (e.g., storage space, audio data processing power) for the chat session and sends invitations the other users of the group to join the chat session. In other words, the chat session starts with only one user who presses the "Real-Time Audio" button 1605. To avoid the allocated resources from being wasted, a timer is set for the chat session such that the chat session is automatically terminated if no other user joins the chat session after a predefined time period. For example, FIG. 16C depicts that a text message 1611 indicates that a two-minute time window is given to the chat session and the message 1611 is updated every second until either another user joins the chat session or the chat session is terminated after two minutes. FIG. 16C also depicts a fan-shaped window 1609 including a dark line that swings from the left to the right, when the user speaks to the mobile device, indicating that there is an active real-time audio broadcast. Below the window 1609 is a push-to-talk icon 1607 through which the user can start his/her real-time audio broadcast. Since no other user has joined the chat session yet, the push-to-talk icon 1607 is temporarily disabled and depicted in gray color or pattern to provide a visual cue to the user that the chat session is not active yet. FIG. 16D depicts another text message 1611, indicating that another user, Bob, has joined the chat session and the chat session is ready to start. Accordingly, the push-to-talk icon 1613 is displayed in a different color or pattern to provide a different visual cue to the user so that the user can push the icon 1613 to start his/her real-time audio broadcast.

In some embodiments, the mobile device detects a first instruction from a user of the mobile device to start a real-time audio broadcast to a plurality of client devices associated with a group of users that have joined the chat session. For example, as a member of the group, the user presses the push-to-talk icon 1613 to start a real-time audio broadcast to other users of the chat session. In some embodiments, a client device associated with a user of the group has two possible working modes after the user joins the chat session: (i) broadcast-enable mode and (ii) broadcast-disable mode. When the client device is in the broadcast-enable mode, the user can press, e.g., the push-to-talk icon on the client device, to start a real-time audio broadcast. The client device remains in the broadcast-enable mode as long as the real-time audio broadcast continues while the other client devices associated with the chat session are in the broadcast-disable mode. By doing so, only one user of the chat session can talk while the other users of the chat sessions are listening to the real-time audio broadcast from the user. After the user stops the real-time audio broadcast, the client devices associated with the other users of the chat session update their working mode from broadcast-disable mode to broadcast-enable mode so that any user can start a new real-time audio broadcast from his/her client device.

Figure 16G:
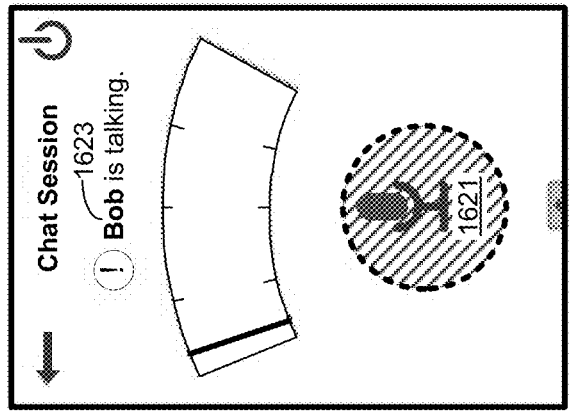
Figure 16F:
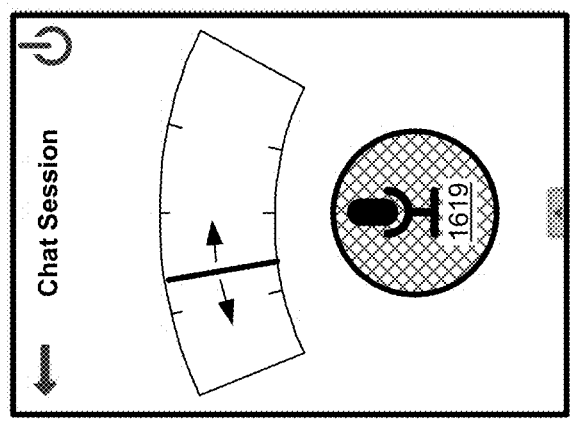
Figure 16E:
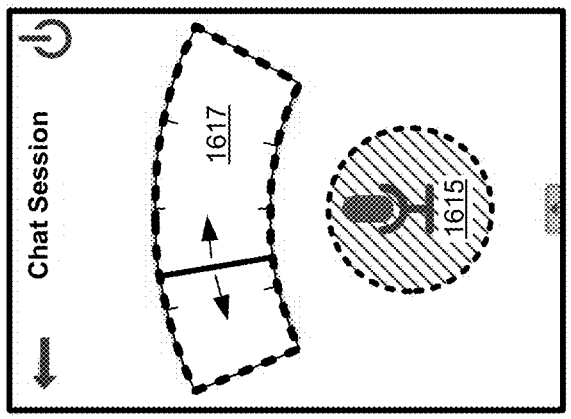

In the instant case, in response to the first instruction, the mobile device sends an audio broadcast start request to a remote server (e.g., the server shown in FIG. 11). In response to the audio broadcast start request, the remote server is configured to instruct the plurality of client devices to enter a broadcast-disable mode so that the user of the mobile device is the only one that can generate real-time audio broadcast at this moment. In some embodiments, the remote server also returns an approval response to the mobile device. Next, the mobile device captures and streams audio signals from the user of the mobile device to the remote server. FIG. 16E depicts an exemplary screenshot of the user talking to the other users using the instant messaging client. In this example, the push-to-talk icon 1615 and the window 1617 have a look-and-feel different from their counterparts shown in FIG. 16D, which provides a visual cue indicating that real-time audio signals are being transmitted from the mobile device to the remote server. The remote server is configured to receive real-time audio streams from the mobile device and transmit them to the plurality of client devices.

At some point in time, the mobile device detects a second instruction from the user of the mobile device to stop the real-time audio broadcast to the plurality of client devices. For example, the user can press the push-to-talk icon 1615 to stop the real-time audio broadcast. In response to the second instruction, the mobile device sends an audio broadcast stop request to the remote server. FIG. 16F is a screenshot illustrating that the audio broadcast is terminated by the user and the mobile device returns to the same status as the one shown in FIG. 16D. In response to the request, the remote server is configured to instruct the plurality of client devices to enter a broadcast-enable mode and return a confirmation response to the mobile device. As noted above, the termination of a real-time audio broadcast at one client device (e.g., the mobile device in this example) triggers the other client devices in the chat session to enter a broadcast-enable mode. Note that the mobile device remains in the broadcast-enable mode after it terminates the real-time audio broadcast.

In some embodiments, there is another possible outcome when the user of the mobile device generates the first instruction by, e.g., pressing the push-to-talk icon 1613 of FIG. 16D to start a real-time audio broadcast. In this case, in response to the first instruction, the mobile device determines whether it is in a broadcast-enable mode or a broadcast-disable mode. In some embodiments, the mobile device queries the remote server for determining its current working mode. If the mobile device is in a broadcast-disable mode, the remote server returns a denial response to the mobile device, the response including an identifier of a user whose associated mobile device is in a broadcast-enable mode, i.e., the user who is currently giving the real-time audio broadcast. As noted above, when there is a real-time audio broadcast from one client device associated with a chat session, all the other client devices are put into the broadcast-disable mode. For example, if another user is giving a real-time audio broadcast when the user presses the push-to-talk icon 1613, the mobile device is in a broadcast-disable mode. Accordingly, the mobile device generates and displays a visual cue on the mobile device indicating that the mobile device is currently disabled from starting a real-time audio broadcast. FIG. 16G is a screenshot including a text messaging 1623 indicating that the user Bob is talking now and the push-to-talk icon 1621 is also grayed out to indicate that the user cannot start another real-time audio broadcast.

Figure 16H:
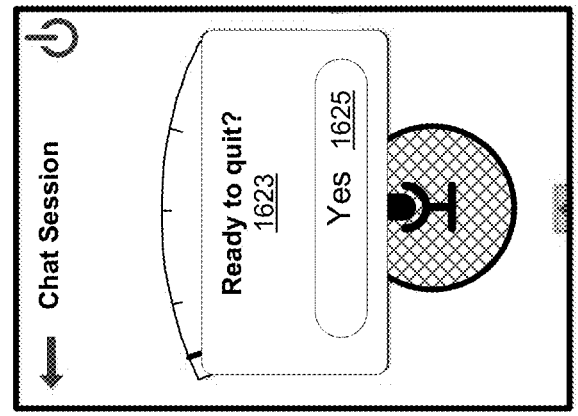

In some embodiments, the user of the mobile device may choose to quit from the chat session at some time. In this case, the mobile device detects a third instruction from the user of the mobile device to quit from the group of users in the chat session. In response to the third instruction, the mobile device sends a quit request to the remote server. FIG. 16H depicts that the mobile device displays a small pop-up window including a text message 1623 and an icon 1625 for the user to confirm his/her decision. Upon receipt of the quit request, the remote server is configured to remove an identifier of the user from the group of users and notify the plurality of client devices of the removal of the user identifier.

Figure 16I:
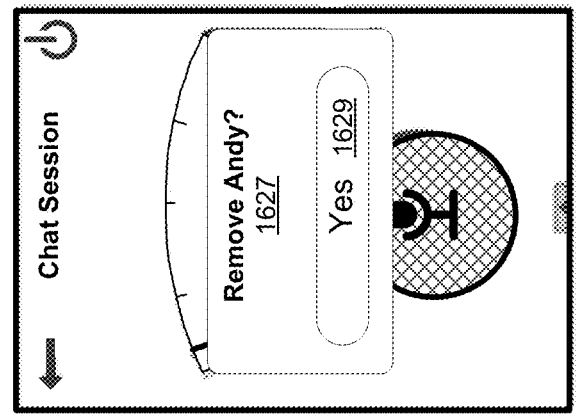
Figure 16J:
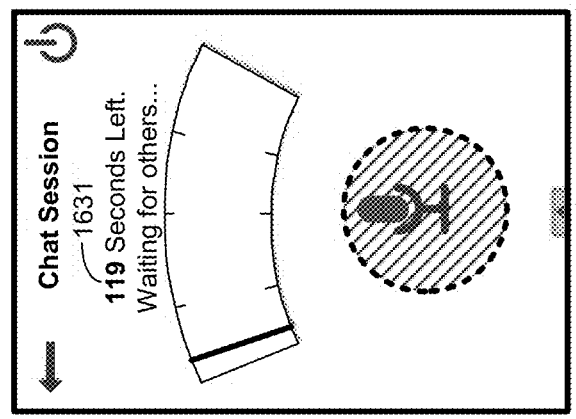

In some embodiments, different users of the group are given different levels of control over the chat session. For example, a user that starts a chat session is given the role of an administrator of the chat session. As an administrator, the user has the right to remove another user from the chat session, e.g., if the other user is deemed to violate certain rules. When this happens, the mobile device associated with the administrator detects a fourth instruction from the user of the mobile device to remove another user from the group of users. In response to the fourth instruction, the mobile device sends a user removal request to the remote server. FIG. 16I depicts that the mobile device displays a popup window including a text message 1627 and an icon 1629 for the administrator to confirm whether another user should be removed from the chat session or not. In response to the request, the remote server is configured to first verify that the user issuing the request is an administrator and then remove an identifier of the user identified in the user removal request from the group of users and notify the plurality of client devices of the removal of the user identifier. In some embodiments, the administrator can also stop a user from giving a real-time audio broadcast without removing the user from the chat session. In this case, the mobile device detects a fifth instruction from the user of the mobile device to stop a real-time audio broadcast from a client device associated with another user. In response to the fifth instruction, the mobile device sends an audio broadcast stop request to the remote server. In response, the remote server is configured to first verify that the user issuing the request is an administrator and then stop the real-time audio broadcast from the client device and instruct the client device to enter a broadcast-disable mode while causing the mobile device to enter a broadcast-enable mode. In other words, by stopping an ongoing audio broadcast, the administrator automatically exercises the control of the chat session to give the real-time audio broadcast. FIG. 16J depicts that the mobile device returns to the same state as FIG. 16C when there is only one user left in the chat session. In some embodiments, before an administrator quits from the chat session, the administrator is given the chance to designate a new administrator for the chat session and transfers the right to the newly-designated administrator accordingly.

Through description of the above embodiment, in the embodiment of the present application, a server in a network is adopted to receive chat session audio information transmitted by an instant messaging client in an intercom group and distribute the chat session audio information to other instant messaging clients, except the instant messaging client, in the intercom group for real-time playing, thereby implementing an intercom talk function between the instant messaging clients in the intercom group and saving the cost for purchasing extra two way radios and transceiver devices. In addition, information exchange is implemented based on the server in the network instead of conventional radio frequencies, thereby improving the confidentiality and stability of the information exchange.

Persons of ordinary skill in the art should understand that all or a part of the steps of the method according to the embodiments may be implemented by a computer program instructing relevant hardware. The program may be stored in a computer readable storage medium. When the program is run, the steps of the method according to the embodiments are performed. The storage medium may be a magnetic disk, an optical disk, a Read-Only Memory (ROM), or a Random Access Memory (RAM).

The above disclosure is merely exemplary embodiments of the present application, but is not intended to limit the protection scope of the present application. Equivalent variations made according to claims of the present application shall fall within the scope of the present application.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. An information exchange method performed at a mobile device having one or more processors and memory for storing program modules to be executed by the one or more processors, wherein the mobile device is communicatively coupled to a remote server, the method comprising:

displaying within an instant messaging application running on the mobile device a first affordance allowing a user of the mobile device to initiate a real-time audio broadcast among a group of users, wherein the user is a member of the group;

detecting a selection of the first affordance by the user;

in response to detecting the user selection of the first affordance, sending a real-time audio broadcast initiation request to the remote server, wherein the remote server is configured to start a periodically updated countdown timer for initiating a real-time audio broadcast and that the countdown timer corresponds to a predetermined time period during which the real-time audio broadcast is initiated before another user joins the real-time audio broadcast, wherein the real-time audio broadcast is automatically terminated by the remote server in accordance with a determination that no other user joins the real-time audio broadcast after the predetermined time period, wherein the remote server, after receiving the real-time audio broadcast initiation request from the mobile device, detects states of other mobile devices in the group; and in response to detecting the other mobile devices in an intercom on state, notifies the mobile device of direct transmission paths, wherein each of the direct transmission paths is a direct wireless connection between the mobile device and a respective one of the other mobile devices without through the remote server;

enabling a second affordance to allow the user to activate the real-time audio broadcast after another member of the group joins the real-time audio broadcast before the timer expires;

detecting a first instruction from a user of the mobile device to start the real-time audio broadcast to a plurality of client devices associated with the group of users, wherein the first instruction is received in response to detecting a first user selection of the second affordance;

in response to the first instruction, sending an audio broadcast start request to the remote server, wherein the remote server is configured to instruct the plurality of client devices to enter a broadcast-disable mode such that only the user of the mobile device can generate the real-time audio broadcast while the group of users can only listen to the real-time audio broadcast;

capturing and streaming audio signals from the user of the mobile device to the remote server and changing appearance of the second affordance indicating the audio signals are being transmitted from the mobile device to the remote server, wherein the remote server is configured to transmit the audio signals to the plurality of client devices;

detecting a second instruction from the user of the mobile device to stop the real-time audio broadcast to the plurality of client devices, wherein the second instruction is received in response to detecting a second user selection of the second affordance; and in response to the second instruction, sending an audio broadcast stop request to the remote server and restoring the appearance of the second affordance, wherein the remote server is configured to instruct the plurality of client devices to enter a broadcast-enable mode such that any user of the plurality of client devices can start a new real-time audio broadcast.

2. The method according to claim 1, further comprising:

in response to the first instruction, determining whether the mobile device is in a broadcast-enable mode or a broadcast-disable mode;

in accordance with a determination that the mobile device is in a broadcast-disable mode, generating and displaying a visual cue on the mobile device indicating that the mobile device is currently disabled from starting a real-time audio broadcast; and in accordance with a determination that the mobile device is in a broadcast-enable mode, allowing the user of the mobile device to start the real-time audio broadcast.

3. The method according to claim 1, further comprising:

detecting a third instruction from the user of the mobile device to quit from the group of users;

in response to the third instruction, sending a quit request to the remote server, wherein the remote server is configured to remove an identifier of the user from the group of users and notify the plurality of client devices of the removal of the user identifier.

4. The method according to claim 1, wherein the user of the mobile device is an administrator of the group of users, the method further comprising:

detecting a fourth instruction from the user of the mobile device to remove another user from the group of users;

in response to the fourth instruction, sending a user removal request to the remote server, wherein the remote server is configured to remove an identifier of the user identified in the user removal request from the group of users and notify the plurality of client devices of the removal of the user identifier.

5. The method according to claim 1, wherein the user of the mobile device is an administrator of the group of users, the method further comprising:
    detecting a fifth instruction from the user of the mobile device to stop a real-time audio broadcast from a client device associated with another user;
    in response to the fifth instruction, sending an audio broadcast stop request to the remote server, wherein the remote server is configured to stop the real-time audio broadcast from the client device and instruct the client device to enter a broadcast-disable mode while causing the mobile device to enter a broadcast-enable mode.

6. A computer-implemented method performed for managing real-time audio broadcasts for a group of users participating from respective mobile devices, the method comprising:
    at a server system having one or more processors and memory for storing program modules to be executed by the one or more processors:
    receiving a real-time audio broadcast initiation request from a user of a mobile device, wherein the user is a member of the group,
    wherein the server system in response to receiving the real-time audio broadcast initiation request is configured to start a periodically updated countdown timer for initiating a real-time audio broadcast and that the countdown timer corresponds to a predetermined time period during which the real-time audio broadcast is initiated before another user joins the real-time audio broadcast, wherein the real-time audio broadcast is automatically terminated by the server system in accordance with a determination that no other user joins the real-time audio broadcast after the predetermined time period, wherein the server system, after receiving the real-time audio broadcast initiation request from the mobile device, detects states of other mobile devices in the group; and
    in response to detecting the other mobile devices in an intercom on state, notifies the mobile device of direct transmission paths, wherein each of the direct transmission paths is a direct wireless connection between the mobile device and a respective one of the other mobile devices without through the server system;
    upon detection of at least one mobile device associated with at least another user in the group joining the real-time audio broadcast prior to expiration of the timer, instructing all mobile devices joining the real-time audio broadcast to enter a broadcast-enable mode;
    receiving an audio broadcast start request from the user at the mobile device; in response to the audio broadcast start request:
    instructing the other mobile devices to enter a broadcast-disable mode such that only the user of the mobile device can generate the real-time audio broadcast while the group of users can only listen to the real-time audio broadcast;
    returning an approval response to the mobile device;
    receiving real-time audio streams from the mobile device; and forwarding the real-time audio streams to the other mobile devices;
    receiving an audio broadcast stop request from the user at the mobile device; in response to the audio broadcast stop request:
    instructing the other mobile devices to enter a broadcast-enable mode such that any user of the plurality of client devices can start a new real-time audio broadcast; and
    returning a confirmation response to the mobile device.

7. The method according to claim 6, further comprising:
    in response to the audio broadcast start request, determining whether the mobile device is in a broadcast-enable mode or a broadcast-disable mode; and
    in accordance with a determination that the mobile device is in a broadcast-disable mode, returning a denial response to the mobile device, the response including an identifier of a user whose associated mobile device is in a broadcast-enable mode.

8. The method according to claim 6, further comprising:
    receiving a quit request from the mobile device;
    in response to the quit request:
        removing an identifier of the user associated with the mobile device from the group of users; and
        notifying the other mobile devices of the removal of the user identifier.

9. The method according to claim 6, further comprising:
    receiving a user removal request from a second mobile device, the request including an identifier of a first user to be removed from the group;
    in response to the user removal request:
        identifying a second user associated with the second mobile device; and
        determining whether the second user is an administrator of the group;
        in accordance with a determination that the second user is the administrator of the group:
            removing the identifier of the first user from the group; and
            notifying the other mobile devices of the removal of the identifier of the first user.

10. The method according to claim 6, further comprising:
    receiving an audio broadcast stop request from a second mobile device, the request including an identifier of a first user to be stopped from broadcasting audio signals to the group;
    in response to the audio broadcast stop request:
        identifying a second user associated with the second mobile device; and
        determining whether the first user is in a broadcast-enable mode and the second user is an administrator of the group;
        in accordance with a determination that the first user is in a broadcast-enable mode and the second user is the administrator of the group:
            instructing a first mobile device associated with the first user to enter a broadcast-disable mode; and
            instructing the second mobile device associated with the second user to enter a broadcast-enable mode.

11. The method according to claim 6, further comprising:
    after processing one of a quit request and a user removal request:
        if there is only one user in the group:
            causing the mobile device associated with the user to enter a broadcast-disable mode; and
            terminating the group if no new user joins the group after a predefined period of time.

12. A server system for managing real-time audio broadcasts for a group of users participating from respective mobile devices:

one or more processors; and memory for storing program modules to be executed by the one or more processors, the program modules including instructions for:

receiving a real-time audio broadcast initiation request from a user of a mobile device, wherein the user is a member of the group, wherein the server system in response to receiving the real-time audio broadcast initiation request is configured to start a periodically updated countdown timer for initiating a real-time audio broadcast and that the countdown timer corresponds to a predetermined time period during which the real-time audio broadcast is initiated before another user joins the real-time audio broadcast, wherein the real-time audio broadcast is automatically terminated by the server system in accordance with a determination that no other user joins the real-time audio broadcast after the predetermined time period, wherein the server system, after receiving the real-time audio broadcast initiation request from the mobile device, detects states of other mobile devices in the group; and in response to detecting the other mobile devices in an intercom on state, notifies the mobile device of direct transmission paths, wherein each of the direct transmission paths is a direct wireless connection between the mobile device and a respective one of the other mobile devices without through the server system;

upon detection of at least one mobile device associated with at least another user in the group joining the real-time audio broadcast prior to expiration of the timer, instructing all mobile devices joining the real-time audio broadcast to enter a broadcast-enable mode;

receiving an audio broadcast start request from the user at the mobile device; in response to the audio broadcast start request:

instructing the other mobile devices to enter a broadcast-disable mode such that only the user of the mobile device can generate the real-time audio broadcast while the group of users can only listen to the real-time audio broadcast;

returning an approval response to the mobile device;

receiving real-time audio streams from the mobile device; and forwarding the real-time audio streams to the other mobile devices;

receiving an audio broadcast stop request from the user at the mobile device;

in response to the audio broadcast stop request:

instructing the other mobile devices to enter a broadcast-enable mode such that any user of the plurality of client devices can start a new real-time audio broadcast; and returning a confirmation response to the mobile device.

13. The server system according to claim 12, wherein the program modules further include instructions for:

in response to the audio broadcast start request, determining whether the mobile device is in a broadcast-enable mode or a broadcast-disable mode; and in accordance with a determination that the mobile device is in a broadcast-disable mode, returning a denial response to the mobile device, the response including an identifier of a user whose associated mobile device is in a broadcast-enable mode.

14. The server system according to claim 12, wherein the program modules further include instructions for:

receiving a quit request from the mobile device;

in response to the quit request:

removing an identifier of the user associated with the mobile device from the group of users; and notifying the other mobile devices of the removal of the user identifier.

15. The server system according to claim 12, wherein the program modules further include instructions for:

receiving a user removal request from a second mobile device, the request including an identifier of a first user to be removed from the group;

in response to the user removal request:

identifying a second user associated with the second mobile device; and determining whether the second user is an administrator of the group;

in accordance with a determination that the second user is the administrator of the group:

removing the identifier of the first user from the group; and notifying the other mobile devices of the removal of the identifier of the first user.

16. The server system according to claim 12, wherein the program modules further include instructions for:

receiving an audio broadcast stop request from a second mobile device, the request including an identifier of a first user to be stopped from broadcasting audio signals to the group;

in response to the audio broadcast stop request:

identifying a second user associated with the second mobile device; and determining whether the first user is in a broadcast-enable mode and the second user is an administrator of the group;

in accordance with a determination that the first user is in a broadcast-enable mode and the second user is the administrator of the group:

instructing a first mobile device associated with the first user to enter a broadcast-disable mode; and instructing the second mobile device associated with the second user to enter a broadcast-enable mode.

17. The server system according to claim 12, wherein the program modules further include instructions for: after processing one of a quit request and a user removal request: when there is only one user in the group: causing the mobile device associated with the user to enter a broadcast-disable mode; and terminating the group when no new user joins the group after a predefined period of time.

18. The method of claim 6, wherein the group of users includes at least one of:

a first user, who belongs to a same instant messaging group as the user of the mobile device, and a second user, who does not belong to the same instant messaging group as the user the mobile device, wherein an invitation sent to the second user by the server system is at least one of: a character string of an ID of the real-time audio broadcast, and a two-dimensional bar code corresponds to the ID of the real-time audio broadcast.

* * * * *